United States Patent
Verma et al.

(10) Patent No.: US 10,827,385 B2
(45) Date of Patent: Nov. 3, 2020

(54) TECHNIQUES FOR PREAMBLE PUNCTURING

(71) Applicant: QUALCOMM Incorporated, San Diego, CA (US)

(72) Inventors: Lochan Verma, San Diego, CA (US); Bin Tian, San Diego, CA (US); Lin Yang, San Diego, CA (US); Jialing Li Chen, San Diego, CA (US); Sameer Vermani, San Diego, CA (US); Youhan Kim, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 4 days.

(21) Appl. No.: 16/173,481

(22) Filed: Oct. 29, 2018

(65) Prior Publication Data
US 2019/0141570 A1 May 9, 2019

Related U.S. Application Data

(60) Provisional application No. 62/659,997, filed on Apr. 19, 2018, provisional application No. 62/582,115, filed on Nov. 6, 2017.

(51) Int. Cl.
  *H04W 28/06* (2009.01)
  *H04L 5/00* (2006.01)
  *H04W 84/12* (2009.01)

(52) U.S. Cl.
  CPC ......... *H04W 28/065* (2013.01); *H04L 5/0007* (2013.01); *H04L 5/0053* (2013.01); *H04W 84/12* (2013.01)

(58) Field of Classification Search
  CPC .... H04L 5/007; H04L 5/0053; H04W 28/065; H04W 84/12
  See application file for complete search history.

(56) References Cited

U.S. PATENT DOCUMENTS

| 10,298,353 B2 * | 5/2019 | Lee ......................... H04L 5/005 |
| 2016/0286404 A1 * | 9/2016 | Rico Alvarino ...... H04L 5/0048 |

(Continued)

FOREIGN PATENT DOCUMENTS

| EP | 3396925 A2 | 10/2018 |
| WO | 2017111567 A2 | 6/2017 |

OTHER PUBLICATIONS

International Search Report and Written Opinion—PCT/US2018/058216—ISA/EPO—dated May 8, 2019.

(Continued)

*Primary Examiner* — Luat Phung
*Assistant Examiner* — Thomas R Cairns
(74) *Attorney, Agent, or Firm* — Kevin M. Donnelly

(57) ABSTRACT

The present disclosure provides techniques for preamble puncturing in wireless local area networks (WLANs). In one implementation, an access point (AP) can identify, within a channel width, one or more bandwidth regions associated with incumbent technologies. The AP can broadcast or advertise, to a basic service set (BSS) initiated or started by the AP, a preamble puncture pattern in one or more management frames, the preamble puncture pattern being based on the bandwidth regions associated with incumbent technologies. In another implementation, an AP can identify a single user (SU) preamble puncture transmission, and can signal in a common portion of a SIG-B field of a multi-user (MU) PPDU format that a resource unit (RU) size is assigned to a same user to indicate the SU preamble puncture transmission. Although these techniques may be used in any frequency band, typical frequency bands may include, but are not limited to, a 2.4 GHz band, a 5 GHz band, and/or a 6 GHz band.

12 Claims, 31 Drawing Sheets

(56) References Cited

U.S. PATENT DOCUMENTS

2017/0181129 A1     6/2017    Bharadwaj et al.
2017/0280452 A1     9/2017    Choi et al.

OTHER PUBLICATIONS

Zhang H (Marvell): BW Field in HE-MU Format; 11-16-0898-00-00ax-bw-field-in-he-mu-format, IEEE Draft; 11-16-0898-00-00AX-BW-Field-In-HE-MU-Format, IEEE-SA Mentor, Piscataway NJ USA, vol. 802.11ax, Jul. 25, 2016, pp. 1-19, XP068107210, Retrieved from the Internet: URL: https://mentor.ieee.org/802.11/dcn/16/11-16-0898-00-00ax-bw-field-in-he-mu-format.pptx [retrieved on Jul. 25, 2016] slides 11-17.

Zhang H (Marvell): "Spec Text for BW Field in HE-MU Format; 11-16-0899-00-00ax-spec-text-for-bw-field-in-he-mu-format", IEEE Draft; 11-6-0899-00-00AX-Spec-Text-For-BW-Field-In-HE-MU-Format, IEEE-SA Mentor, Piscataway, NJ USA, vol. 802.11ax, Jul. 25, 2016, pp. 1-4, XP068107211, Retrieved from the Internet: URL: https://mentor.ieee.org/802.11/dcn/16/11-16-0899-00-00ax-spec-text-for-bw-field-in-he-mu-format.docx [retrieved on Jul. 25, 2016] p. 2-p. 3.

Fischer M., "Disallowed-Sub-Channels", IEEE Draft; 11-18-0496-02-00AX-Disallowed-Sub-Channels, IEEE-SA Mentor, Piscataway, NJ, USA, vol. 802.11ax, No. 2, Apr. 17, 2018 (Apr. 17, 2018), pp. 1-7, XP068125503, Retrieved from the Internet: URL: https://mentor.ieee.org/802.11/dcn/18/11-18-0496-02-00ax-disallowed-sub-channels.docx.

Partial International Search Report—PCT/US2018/058216—ISA/EPO—dated Feb. 7, 2019.

Robert S., "IEEE Draft P802.11 ax D1.3", Jun. 5, 2017 (Jun. 5, 2017), pp. 1-522, XP055506059, Retrieved from the Internet: URL: http://www.ieee802.org/11/private/Draft_Standards/11ax/Draft%20P802.11ax_D1.3.pdf.

Seok Y., "LB225 CR Sub Clause 10.22.2.5", IEEE Draft; 11-17-0209-01-00AX-LB225-CR-1 0-22-2-5, IEEE-SA Mentor, Piscataway, NJ, USA, vol. 802.11 ax, No. 1, Feb. 28, 2017 (Feb. 28, 2017), pp. 1-8, XP068112660, Retrieved from the Internet: URL: https://mentor.ieee.org/802.11/dcn/17/11-17-0209-01-00ax-lb225-cr-10-22-2-5.docx.

\* cited by examiner

Preamble Puncturing Mode 1:

| P20 | S20 | S40 |

In 11ac, S20 CCA busy leads to 20 MHz Tx, ~3x Throughput over 11ac
Receiver is able to decode SIGB-C1 and SIGB-C2 from the known puncturing landscape Preamble Puncturing Mode 2:

| P20 | S20 | S40-L | S40-R |

OR

| P20 | S20 | S40-L | S40-R |

Receiver is able to decode SIGB-C1 and SIGB-C2 from P40

FIG. 3A

Preamble Puncturing Mode 3:

| P20 | S20 | S40 | S80 |

In 11ac, S20 CCA busy leads to 20 MHz Tx, up to ~7x Throughput over 11ac! Receiver is able to decode SIGB-C1 and SIGB-C2 from the known puncturing landscape Preamble Puncturing Mode 4:

| P20 | S20 | S40-L | S40-R | S80 |

OR

| P20 | S20 | S40-L | S40-R | S80 |

OR

| P20 | S20 | S40-L | S40-R | S80 |

In 11ac, S40 CCA busy leads to 40MHz Tx, up to ~3.5x Throughput of 11ac! Receiver is able to decode SIGB-C1 and SIGB-C2 from P40

Puncturing may happen in S80, but not need to be signaled by SIGA, because typically SIGB decoding won't use S80

FIG. 3B

* RU Table 1 – 8 indicates "242 assigned to the same single user"
† User Field 1 has STA ID that is assigned the RU allocation signaled in RU Table 1 - 8

| Subfield | Number of bits | Description |
|---|---|---|
| RU Allocation | N x 8 | Indicates the RU assignment in the frequency domain. It also indicates the number of users in each RU. For RUs of size greater than or equal to 106-tones that support MU-MIMO, it indicates the number of users multiplexed using MU-MIMO.<br>Consists of N RU Allocation subfields:<br>   N = 1 for a 20 MHz and a 40 MHz HE MU PPDU<br>   N = 2 for a 80 MHz HE MU PPDU<br>   N = 4 for a 160 MHz or 80+80 MHz HE MU PPDU |
| Center 26-tone RU | 1 | This field is present only when the value of the Bandwidth field of HE-SIG-A field in an HE MU PPDU is set to greater than 1.<br>When the Bandwidth field of the HE-SIG-A field in an HE MU PPDU is set to 2, 4 or 5 for 80 MHZ:<br>   Set to 1 to indicate that a user is allocated to the center 26-tone RU (see Figures 28-7 (RU locations in an 80 MHz HE PPDU)); otherwise, wet to 0.<br>   Use the same value in both HE-SIG-B content channels.<br>When the Bandwidth field of the HE-SIG-A field in an HE MU PPDU is set to 3, 6 or 7 for 160 MHz or 80+80 MHz:<br>   For HE-SIG-B content channel 1, set to 1 to indicate that a user is allocated to the center 26-tone RU of the lower frequency 80 MHz; otherwise, set to 0.<br>   For HE-SIG-B content channel 2, set to 1 to indicate that a user is allocated to the center 26-tone RU of the higher frequency 80 MHz; otherwise, set to 0. |
| CRC | 4 | See 28.3.10.7.3 (CRC computation) |
| Tail | 6 | Used to terminate the treliss of the convolutional decoder. Set to 0 |

NOTE—Integer fields are transmitted in unsigned binary format, LSB first, where the LSB is in the lowest numbered bit position.

FIG. 11

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| 00010$y_2y_1y_0$ | 52 | | 52 | | - | 106 | | | | 8 |
| 00011$y_2y_1y_0$ | 106 | | | | - | 52 | | 52 | | 8 |
| 00100$y_2y_1y_0$ | 26 | 26 | 26 | 26 | 26 | 106 | | | | 8 |

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00101$y_2y_1y_0$ | 26 | 26 | 52 | 26 | 106 | | | | | 8 |
| 00110$y_2y_1y_0$ | 52 | 26 | 26 | 26 | 106 | | | | | 8 |
| 00111$y_2y_1y_0$ | 52 | 52 | 26 | 106 | | | | | | 8 |
| 01000$y_2y_1y_0$ | 106 | | 26 | 26 | 26 | 26 | 26 | | | 8 |
| 01001$y_2y_1y_0$ | 106 | | 26 | 26 | 26 | 52 | | | | 8 |
| 01010$y_2y_1y_0$ | 106 | | 26 | 52 | 26 | 26 | | | | 8 |
| 01011$y_2y_1y_0$ | 106 | | 26 | 52 | 52 | | | | | 8 |
| 0110$y_1y_0y_1y_0$ | 106 | | – | 106 | | | | | | 16 |
| 01110000 | 52 | 52 | – | 52 | 52 | | | | | 1 |
| 01110001 | 242-tone RU empty | | | | | | | | | 1 |
| 01110010 | 484-tone RU with no User fields in the HE-SIG-B content channel containing this RU Allocation subfield | | | | | | | | | 1 |
| 01110011 | 996-tone RU with no User fields in the HE-SIG-B content channel containing this RU Allocatoin subfield | | | | | | | | | 1 |
| 011101$x_1x_0$ | Reserved | | | | | | | | | 4 |
| 01111$y_2y_1y_0$ | Reserved | | | | | | | | | 8 |
| 10$y_2y_1y_0z_2z_1z_0$ | 106 | | 26 | 106 | | | | | | 64 |
| 11000$y_2y_1y_0$ | 242 | | | | | | | | | 8 |
| 11001$y_2y_1y_0$ | 484 | | | | | | | | | 8 |
| 11010$y_2y_1y_0$ | 996 | | | | | | | | | 8 |
| 11011$y_2y_1y_0$ | 2x996 | | | | | | | | | 8 |
| 111$x_4x_3x_2x_1x_0$ | Reserved | | | | | | | | | 32 |

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| In the case of load balancing for Rus of size greater than 242-tone RU, $y_2y_1y_0$ = 000-111 indicates number of User fields in the HE-SIG-B content channel that contains the corresponding 8-bit RU Allocation subfield. Otherwise, $y_2y_1y_0$ = 000-111 indicates number of STAs multiplexed in the 106-tone RU, 242-tone RU or the lower frequency 106-tone RU if there are two 106-tone RUs and one 26-tone RU is assigned between two 106-tone RUs. The binary vector $y_2y_1y_0$ indicates $2^2 \times y_2 + 2^1 \times y_1 + y_0 + 1$ STAs multiplexed the RU. $z_2z_1z_0$ = 000-111 indicates number of STAs multiplexed in the higher frequency 106-tone RU if there are two 106-tone RUs and one 26-tone RU is assigned between two 106-tone RUs. The binary vector $z_2z_1z_0$ indicates $2^2 \times z_2 + 2^1 \times z_1 + z_0 + 1$ STAs multiplexed in the RU. Similarly, $y_1y_0$ = 00-11 indicates number of STAs multiplexed in the lower frequency 106-tone RU. The binary vector $y_1y_0$ indicates $2^1 \times y_1 + y_0 + 1$ STAs multiplexed in the RU. Similarly, $z_1z_0$ = 00-11 indicates number of STAs multiplexed in the lower frequency 106-tone RU. The binary vector $z_1z_0$ indicates $2^1 \times y_1 + y_0 + 1$ STAs multiplexed in the RU. #1 to #9 (from left to the right) is ordered in increasing order of the absolute frequency. $x_1x_0$ = 00-11, $x_4x_3x_2x_1x_0$ = 00000-11111. '-' means no STA in that RU. | | | | | | | | | | |

FIG. 12C

| Bit | Field | Number of bits | Description |
|---|---|---|---|
| B0-B10 | STA-ID | 11 | Set to a value of the element indicated from TXVECTOR parameter STA_ID_LIST (see 27.11.1 (STA_ID_LIST)). |
| B11-B13 | NSTS | 3 | Number of spatial streams.<br><br>Set to the number of space-time streams minus 1. |
| B14 | Tx Beamforming | 1 | Use of transmit beamforming.<br><br>Set to 1 if a beamforming steering matrix is applied to the waveform in an SU transmission. Set to 0 otherwise. |
| B15-B18 | MCS | 4 | Modulation and coding scheme<br><br>Set to $n$ for MCS$n$, where $n$ = 0, 1, 2 ....., 11<br>Values 12 to 15 are reserved |
| B19 | DCM | 1 | Indicates whether or not dual carrier modulation is used.<br>   Set to 1 to indicate that the HE-Data portion of the corresponding user of the HE MU PPDU is modulated with dual carrier modulation for the MCS. Set to 0 indicates that the payload of the PPDU is not modulated with dual carrier modulation for the MSC. |
| B20 | Coding | 1 | Indicates whether BCC or LDPC is used.<br>   Set to 0 for BCC<br>   Set to 1 for LDPC |
| NOTE—Integer fields are transmitted in unsigned binary format, LSB first, where the LSB is in the lowest numbered bit position. | | | |

FIG. 13

TECHNIQUES FOR PREAMBLE PUNCTURING

CROSS-REFERENCE TO RELATED APPLICATION(S)

This application claims the benefit of U.S. Provisional Application Ser. No. 62/659,997, entitled "TECHNIQUES FOR PREAMBLE PUNCTURING" and filed on Apr. 19, 2018, and U.S. Provisional Application Ser. No. 62/582,115, entitled "TECHNIQUES FOR PREAMBLE PUNCTURING" and filed on Nov. 6, 2017, which are expressly incorporated by reference herein in their entirety.

BACKGROUND

The deployment of wireless local area networks (WLANs) in the home, the office, and various public facilities is commonplace today. Such networks typically employ a wireless access point (AP) that connects a number of wireless stations (STAs) in a specific locality (e.g., home, office, public facility) to another network, such as the Internet or the like. A set of STAs can communicate with each other through a common AP in what is referred to as a basic service set (BSS).

With the increased use of WLANs, support for new bands (e.g., 6 GHz band) may be added to WLAN-based specifications such as IEEE 802.11ax, for example. Because of the presence of incumbent technologies in this band, it may be difficult to find contiguous 80 MHz or 160 MHz idle channels for operation. Preamble puncturing may be introduced to avoid interference with the incumbent technologies.

As such, it is desirable to provide techniques that allow for more flexibility in the implementation of preamble puncturing.

SUMMARY

Aspects of the present disclosure address techniques for preamble puncturing. The following description and the annexed drawings set forth detail of certain illustrative features of the one or more aspects. These features are indicative, however, of but a few of the various ways in which the principles of various aspects may be employed, and this description is intended to include all such aspects and their equivalents.

In an aspect, a method for wireless communications by a wireless device is disclosed. The method may include identifying, within a channel width, one or more bandwidth regions associated with incumbent technologies; and broadcasting, to a basic service set (BSS) initiated by the wireless device, a preamble puncture pattern in one or more management frames, the preamble puncture pattern being based on the one or more bandwidth regions associated with incumbent technologies.

In another aspect, an apparatus for wireless communications is disclosed. The apparatus may include a transceiver, a memory configured to store instructions, and a processor communicatively coupled with the memory. The processor may be configured to execute the instructions to identify, within a channel width, one or more bandwidth regions associated with incumbent technologies. The processor may also be configured to execute the instructions to broadcast, to a BSS initiated by the apparatus, a preamble puncture pattern in one or more management frames, the preamble puncture pattern being based on the one or more bandwidth regions associated with incumbent technologies.

In another aspect, an apparatus for wireless communications is disclosed. The apparatus may include means for identifying, within a channel width, one or more bandwidth regions associated with incumbent technologies. The apparatus may also include means for broadcasting, to a BSS initiated by the apparatus, a preamble puncture pattern in one or more management frames, the preamble puncture pattern being based on the one or more bandwidth regions associated with incumbent technologies.

In another aspect, a computer-readable medium storing executable code for wireless communications by a wireless device is disclosed. The computer-readable medium may include code for identifying, within a channel width, one or more bandwidth regions associated with incumbent technologies. The computer-readable medium may also include code for broadcasting, to a BSS initiated by the wireless device, a preamble puncture pattern in one or more management frames, the preamble puncture pattern being based on the one or more bandwidth regions associated with incumbent technologies.

In another aspect, a method for wireless communications is disclosed. The method may include identifying a single user (SU) preamble puncture transmission. The method may also include signaling in a common portion of a SIG-B field of a multi-user (MU) Physical Layer Convergence Procedure (PLCP) Protocol Data Unit (PPDU) format that a resource unit (RU) size is assigned to a same user to indicate the SU preamble puncture transmission.

In another aspect, an apparatus for wireless communications is disclosed. The apparatus may include a transceiver, a memory configured to store instructions, and a processor communicatively coupled with the memory. The processor may be configured to execute the instructions to identify an SU preamble puncture transmission. The processor may be configured to execute the instructions to signal in a common portion of a SIG-B field of a MU PPDU format that an RU size is assigned to a same user to indicate the SU preamble puncture transmission.

In another aspect, an apparatus for wireless communications is disclosed. The apparatus may include means for identifying an SU preamble puncture transmission. The apparatus may also include means for signaling in a common portion of a SIG-B field of an MU PPDU format that an RU size is assigned to a same user to indicate the SU preamble puncture transmission.

In another aspect, a computer-readable medium storing executable code for wireless communications is disclosed. The computer-readable medium may include code for identifying an SU preamble puncture transmission. The computer-readable medium may include code for code for signaling in a common portion of a SIG-B field of a MU PPDU format that an RU size is assigned to a same user to indicate the SU preamble puncture transmission.

In yet another aspect, a method of wireless communications is disclosed. The method may include indicating a puncture pattern via one or more management frames. The method may also include indicating, via a preamble of an MU PPDU, that an incoming transmission is an SU preamble puncture transmission based on the puncture pattern.

In another aspect, an apparatus for wireless communications is disclosed. The apparatus may include a transceiver, a memory configured to store instructions, and a processor communicatively coupled with the memory. The processor may be configured to execute the instructions to indicate a puncture pattern via one or more management frames. The processor may also be configured to indicate, via a preamble of an MU PPDU that an incoming transmission is an SU preamble puncture transmission based on the puncture pattern.

In another aspect, an apparatus for wireless communications is disclosed. The apparatus may include means for indicating a puncture pattern via one or more management frames. The apparatus may also include means for indicating, via a preamble of an MU PPDU, that an incoming transmission is an SU preamble puncture transmission based on the puncture pattern.

In another aspect, a computer-readable medium storing executable code for wireless communications is disclosed. The computer-readable medium may include code for indicating a puncture pattern via one or more management frames. The computer-readable medium may also include code for indicating, via a preamble of an MU PPDU, that an incoming transmission is an SU preamble puncture transmission based on the puncture pattern.

In yet another aspect, a method of wireless communications is disclosed. The method may include receiving a preamble puncture pattern in one or more management frames, the preamble puncture pattern being based on one or more bandwidth regions associated with incumbent technologies. The method may also include receiving a packet. The method may further include decoding the packet based on the preamble puncture pattern.

In another aspect, an apparatus for wireless communications is disclosed. The apparatus may include a transceiver, a memory configured to store instructions, and a processor communicatively coupled with the memory. The processor may be configured to receive a preamble puncture pattern in one or more management frames, the preamble puncture pattern being based on one or more bandwidth regions associated with incumbent technologies. The processor may also be configured to receive a packet. The processor may further be configured to decode the packet based on the preamble puncture pattern.

In another aspect, an apparatus for wireless communications is disclosed. The apparatus may include means for receiving a preamble puncture pattern in one or more management frames, the preamble puncture pattern being based on one or more bandwidth regions associated with incumbent technologies. The apparatus may also include means for receiving a packet. The apparatus may further include decoding the packet based on the preamble puncture pattern.

In another aspect, a computer-readable medium storing executable code for wireless communications is disclosed. The computer-readable medium may include code for receiving a preamble puncture pattern in one or more management frames, the preamble puncture pattern being based on one or more bandwidth regions associated with incumbent technologies. The computer-readable medium may also include code for receiving a packet. The computer-readable medium may further include code for decoding the packet based on the preamble puncture pattern.

In yet another aspect, a method of wireless communications is disclosed. The method may include receiving a packet including a common portion of a SIG-B field of an MU PPDU format that an RU size is assigned to a same user to indicate an SU preamble puncture transmission. The method may also include decoding the packet based on the SU preamble puncture transmission.

In another aspect, an apparatus for wireless communications is disclosed. The apparatus may include a transceiver, a memory configured to store instructions, and a processor communicatively coupled with the memory. The processor may be configured to receive a packet including a common portion of a SIG-B field of an multi-user MU PPDU format that an RU size is assigned to a same user to indicate a SU preamble puncture transmission. The processor may also be configured to decode the packet based on the SU preamble puncture transmission.

In another aspect, an apparatus for wireless communications is disclosed. The apparatus may include means for receiving a packet including a common portion of a SIG-B field of an MU PPDU format that an RU size is assigned to a same user to indicate an SU preamble puncture transmission. The apparatus may also include means for decoding the packet based on the SU preamble puncture transmission.

In another aspect, a computer-readable medium storing executable code for wireless communications is disclosed. The computer-readable medium may include code for receiving a packet including a common portion of a SIG-B field of an MU PPDU format that an RU size is assigned to a same user to indicate an SU preamble puncture transmission. The computer-readable medium may also include code for decoding the packet based on the SU preamble puncture transmission.

In yet another aspect, a method of wireless communications is disclosed. The method may include receiving a puncture pattern via one or more management frames. The method may also include receiving an MU PPDU. The method may further include determining that an incoming transmission is an SU preamble puncture transmission based on the puncture pattern and the preamble of the MU PPDU. The method may also include decoding the MU PPDU based on the SU puncture pattern.

In another aspect, an apparatus for wireless communications is disclosed. The apparatus may include a transceiver, a memory configured to store instructions, and a processor communicatively coupled with the memory. The processor may be configured to receive a puncture pattern via one or more management frames. The processor may also be configured to receive an MU PPDU. The processor may further be configured to determine that an incoming transmission is an SU preamble puncture transmission based on the puncture pattern and the preamble of the MU PPDU. The processor may also be configured to decode the MU PPDU based on the SU puncture pattern.

In another aspect, an apparatus for wireless communications is disclosed. The apparatus may include means for receiving a puncture pattern via one or more management frames. The apparatus may also include means for receiving an MU PPDU. The apparatus may further include determining that an incoming transmission is an SU preamble puncture transmission based on the puncture pattern and the preamble of the MU PPDU. The apparatus may also include means for decoding the MU PPDU based on the SU puncture pattern.

In another aspect, a computer-readable medium storing executable code for wireless communications is disclosed. The computer-readable medium may include code for receiving a puncture pattern via one or more management frames. The computer-readable medium may also include code for receiving an MU PPDU. The computer-readable medium may further include code for determining that an incoming transmission is an SU preamble puncture transmission based on the puncture pattern and the preamble of the MU PPDU. The computer-readable medium may also include code for decoding the MU PPDU based on the SU puncture pattern.

Each of the aspects described above can also be implemented using means for performing the various functions described in connection with those aspects.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 3A is a schematic diagram illustrating examples of currently supported preamble puncturing modes;

FIG. 3B is a schematic diagram illustrating additional examples of currently supported preamble puncturing modes;

FIG. 11 is a diagram illustrating an example of a common field format;

FIGS. 12A-12C are diagrams illustrating an example of a resource unit (RU) allocation subfield;

FIG. 13 is a diagram illustrating an example of a user field format for a non-MU MIMO allocation;

DETAILED DESCRIPTION

Figure 1:
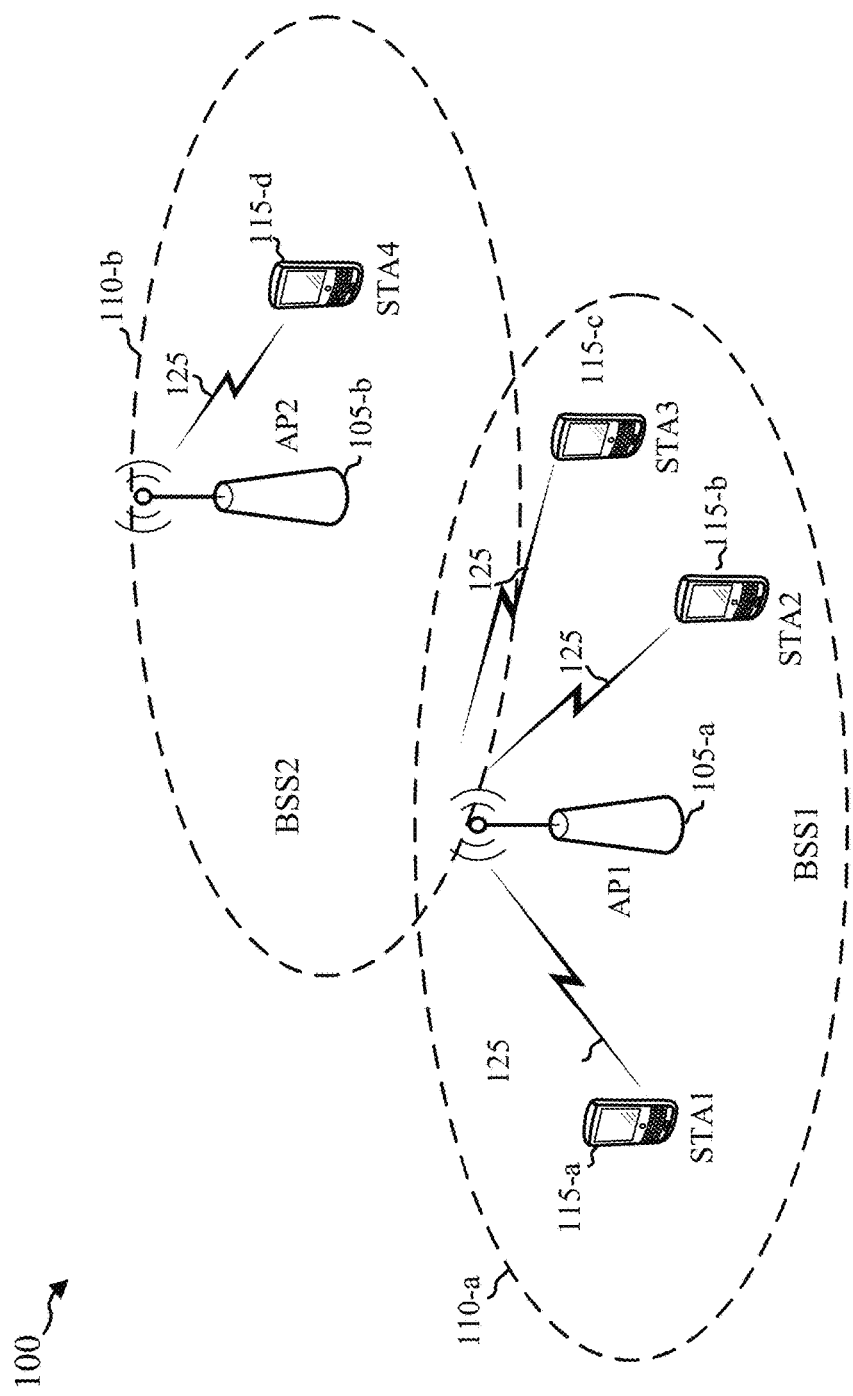
FIG. 1 is a conceptual diagram illustrating an example of a wireless local area network (WLAN) deployment.

The present disclosure describes techniques for preamble puncturing, and in particular, techniques that support preamble puncturing for single user (SU) transmission. As described herein, these techniques may be implemented as methods, apparatuses, computer-readable media, and means for wireless communications.

As noted above, with the increased use of wireless local area networks (WLANs), support for new bands (e.g., 6 GHz band) may be added to WLAN-based specifications such as IEEE 802.11ax, for example. The 6 GHz band may allow for unlicensed operation of WLAN. Because of the presence of incumbent technologies in this band, finding contiguous 80 MHz or 160 MHz idle channels for operation may be difficult. Incumbent technologies, which may also be referred to as bandwidth exclusion zones, may be associated with certain frequency bands used by already present, existing, or established wireless technologies that WLAN communications need to avoid interfering with or with which interference is to be minimized. That is, when using wide bands it may be difficult to avoid overlapping with existing technologies. Preamble puncturing may be introduced to avoid interference with the incumbent technologies. In an example, an access point (AP) transmitting to several clients using 160 MHz transmission, depending on the availability of certain channels within the 160 MHz, may have to puncture the preamble and the data for part of those clients. The channels that are not available within the 160 MHz will not be carrying any preamble or data (e.g., no orthogonal frequency-division multiplexing (OFDM) symbols).

IEEE 802.11ax introduces a preamble puncturing mode which allows non-primary 20 MHz channels to be zeroed out in ≥80 MHz bandwidth transmissions. This approach is currently only specified for downlink (DL) multi-user (MU) Physical Layer Convergence Procedure (PLCP) Protocol Data Units (PPDUs) and not for SU transmissions. Uplink (UL) preamble puncturing is generally possible using high-efficiency (HE) trigger-based (TB) PPDUs. In a current version of IEEE 802.11ax, each wireless station (STA) is allowed to be assigned to only one (1) resource unit (RU) (both UL and DL) so preamble puncturing may not be applied to SU transmission. This disclosure provides various techniques to expand preamble puncturing to SU transmissions in 6 GHz. These techniques, however, are also applicable to other frequency bands such as 2.4 GHz band or 5 GHz band.

Various aspects are now described in more detail with reference to the FIGS. 1-22. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in other examples.

While the following description includes references to high-efficiency devices such as APs and stations (STAs), the following techniques may also apply to other devices such as extremely high throughput (EHT) devices.

FIG. 1 is a conceptual diagram 100 illustrating an example of a WLAN deployment in connection with various techniques described herein, including the various aspects described herein in connection with preamble puncturing. The WLAN may include one or more APs and one or more STAs associated with a respective AP. One or more of the APs and one or more of the STAs may support the techniques described herein.

In the example of FIG. 1, there are two APs deployed: AP1 105-a in basic service set 1 (BSS1) and AP2 105-b in BSS2, which may be referred to as an overlapping BSS (OBSS). AP1 105-a is shown as having at least three associated STAs (STA1 115-a, STA2 115-b, STA3 115-c) and coverage area 110-a, while AP2 105-b is shown having one associated STA4 115-c and coverage area 110-b. The STAs and AP associated with a particular BSS may be referred to as members of that BSS. In the example of FIG. 1, the coverage area 110-a of AP1 105-a may overlap part of the coverage area 110-b of AP2 105-b such that a STA may be within the overlapping portion of the coverage areas 110-a and 110-b. The number of BSSs, APs, and STAs, and the coverage areas of the APs described in connection with the WLAN deployment of FIG. 1 are provided by way of illustration and not of limitation.

An STA 115 in FIG. 1, or in a similar WLAN deployment, can include a modem (not shown) with a preamble puncturing component 2250 as described in more detail below in FIG. 22. The modem of the STA 115 may support preamble puncturing operations described in this disclosure. Similarly, an AP 105 in FIG. 1, or in a similar deployment, can include a modem (not shown) with a preamble puncturing component 1850 as described in more detail below in FIG. 18. The modem of the AP 105 may support the preamble puncturing operations described in this disclosure.

In some examples, the APs (e.g., AP1 105-a and AP2 105-b) shown in FIG. 1 are generally fixed terminals that provide backhaul services to STAs 115 within its coverage area or region. In some applications, however, the AP 105 may be a mobile or non-fixed terminal. The STAs (e.g., STA1 115-a, STA2 115-b, STA3 115-c, STA4 115-d) shown in FIG. 1, which may be fixed, non-fixed, or mobile terminals, utilize the backhaul services of their respective AP to connect to a network, such as the Internet. Examples of an STA 115 include, but are not limited to: a cellular phone, a smart phone, a laptop computer, a desktop computer, a personal digital assistant (PDA), a personal communication system (PCS) device, a personal information manager (PIM), a personal navigation device (PND), a global positioning system, a multimedia device, a video device, an audio device, a device for the Internet-of-Things (IoT), or any other suitable wireless apparatus requiring the backhaul services of an AP 105. An STA 115 may also be referred to by those skilled in the art as: a subscriber station, a mobile unit, a subscriber unit, a wireless unit, a remote unit, a mobile device, a wireless device, a wireless communications device, a remote device, a mobile subscriber station, an access terminal, a mobile terminal, a wireless station, a remote terminal, a handset, a user agent, a mobile client, a client, user equipment (UE), or some other suitable terminology. An AP 105 may also be referred to as: a base station, a base transceiver station, a radio base station, a radio transceiver, a transceiver function, or any other suitable terminology. The various concepts described throughout this disclosure are intended to apply to all suitable wireless apparatus regardless of their specific nomenclature. In an example, an STA 115 that supports HE BSS operations may be referred to as an HE STA. Similarly, an AP 105 that supports HE BSS operations may be referred to as an HE AP. Moreover, an HE STA may operate as an HE AP or as an HE mesh STA, for example.

Each of STA1 115-a, STA2 115-b, STA3 115-c, STA4 115-d may be implemented with a protocol stack. The protocol stack can include a physical layer for transmitting and receiving data in accordance with the physical and electrical specifications of the wireless channel, a data link layer for managing access to the wireless channel, a network layer for managing source to destination data transfer, a transport layer for managing transparent transfer of data between end users, and any other layers necessary or desirable for establishing or supporting a connection to a network.

Each of AP1 105-a and AP2 105-b can include software applications and/or circuitry to enable associated STAs to connect to a network via communications link 125. The APs can send frames or packets to their respective STAs 115 and receive frames or packets from their respective STAs 115 to communicate data and/or control information (e.g., signaling).

Each of AP1 105-a and AP2 105-b can establish a communications link 125 with an STA 115 that is within the coverage area of the corresponding AP 105. Communications link 125 can comprise communications channels that can enable both UL and DL communications. When connecting to an AP 105, an STA 115 can first authenticate itself with the AP 105 and then associate itself with the AP 105. Once associated, communications link 125 may be established between AP 105 and STA 115 such that AP 105 and the associated STA 115 may exchange frames or messages through a direct communications channel. It should be noted that the wireless communication system, in some examples, may not have a central AP (e.g., AP 105), but rather may function as a peer-to-peer network between the STAs 115. Accordingly, the functions of AP 105 described herein may alternatively be performed by one or more of STAs 115. Such systems may be referred to as an "ad-hoc" communication systems in which terminals asynchronously communication directly with each other without use of any specific AP referred to as an independent BSS (IBSS) or mesh. Features of the present disclosure may be equally adaptable in such "ad-hoc" communication system where a broadcasting STA 115 function as the transmitting device of the plurality of multicast frames in lieu of AP 105.

While aspects of the present disclosure are described in connection with a WLAN deployment or the use of IEEE 802.11-compliant networks, those skilled in the art will readily appreciate, the various aspects described throughout this disclosure may be extended to other networks employing various standards or protocols including, by way of example, BLUETOOTH® (Bluetooth), HiperLAN (a set of wireless standards, comparable to the IEEE 802.11 standards, used primarily in Europe), and other technologies used in wide area networks (WAN)s, WLANs, personal area networks (PAN)s, or other suitable networks now known or later developed. Thus, the various aspects presented throughout this disclosure for performing preamble puncturing operations may be applicable to any suitable wireless network regardless of the coverage range and the wireless access protocols utilized.

In some aspects, one or more APs (105-*a* or 105-*b*) may transmit on one or more channels (e.g., multiple narrowband channels, each channel including a frequency bandwidth) a beacon signal (or simply a "beacon"), via communications link 125 to STA(s) 115 of the wireless communication system, which may help STA(s) 115 to synchronize their timing with APs 105, or which may provide other information or functionality. Such beacons may be transmitted periodically. In one aspect, the period between successive beacon transmissions may be referred to as a beacon interval. Transmission of a beacon may be divided into a number of groups or intervals. In one aspect, the beacon may include, but is not limited to, such information as timestamp information to set a common clock, a peer-to-peer network identifier, a device identifier, capability information, a beacon interval, transmission direction information, reception direction information, a neighbor list, and/or an extended neighbor list, some of which are described in additional detail below. Thus, a beacon may include information that is both common (e.g., shared) amongst several devices and specific to a given device. In another example, such beacons or other management frames may be used to provide signaling for preamble puncturing as described below.

Figure 2:
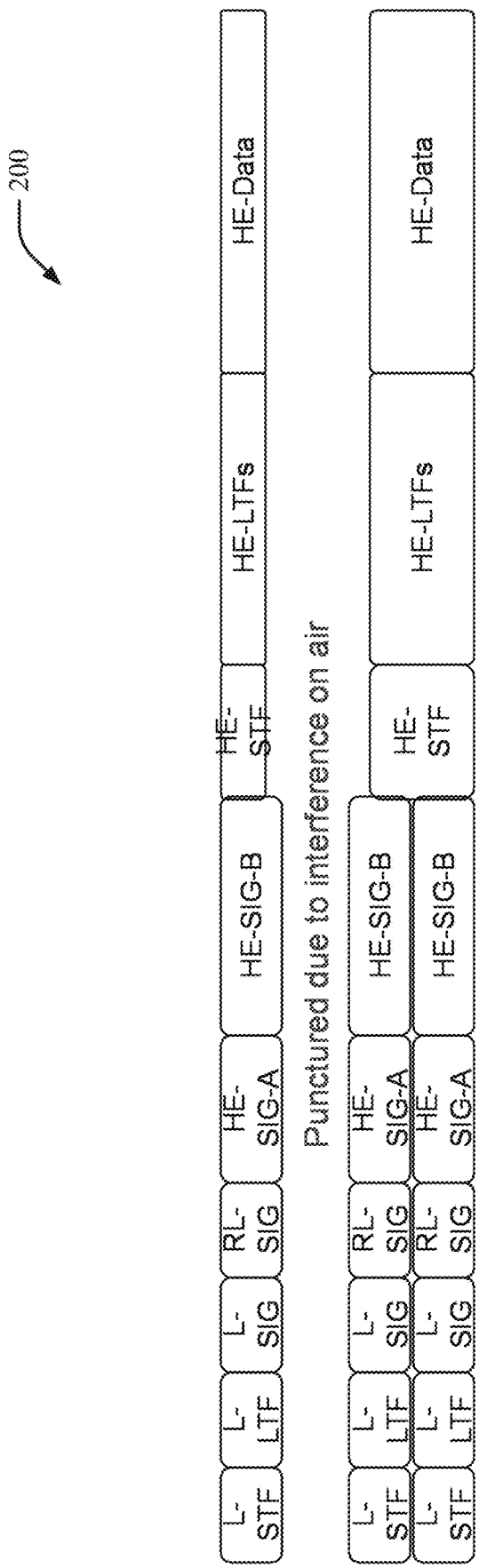
FIG. 2 is a schematic diagram illustrating an example of a multi-user (MU) PLCP protocol data unit (PPDU) format.

FIG. 2 shows a diagram 200 illustrating an example of an HE MU PPDU format as part of an overview of preamble puncturing supported by IEEE 802.11ax. Currently, preamble puncturing is only specified for DL and MU PPDU transmissions, and not for SU transmission. The pre-HE preamble (e.g., fields L-STF, L-LTF, L-SIG, RL-SIG, HE-SIG-A, and HE-SIG-B in the diagram 200) only transmits on the 20 MHz channels that are idle. The data portion is transmitted in OFDMA and avoids RU allocation in the 20 MHz channel with interference. As described above, UL preamble puncturing can be done using HE trigger-based PPDU. An AP (e.g., AP 105) may avoid the allocation of any clients in a busy 20 MHz channel. An STA (e.g., STA 115) may only transmit pre-HE preamble in the 20 MHz channels that overlap with its assigned RU. As mentioned above, each STA is allowed to be assigned to only one RU (both UL and DL) and therefore preamble puncturing is not supported for SU transmissions.

The present disclosure provides two approaches to enable preamble puncturing in SU transmissions. One approach involves using a MU PPDU format for SU preamble puncture. Another approach involves using a SU PPDU format for SU preamble puncture.

In the approach that uses the MU PPDU format, the existing HE-SIG-A/B signaling in MU preamble puncturing is reused. For example, HE-SIG-A field can indicate 4 preamble puncturing modes (described in more detail with respect to FIGS. 3A and 3B). Moreover, the HE-SIG-B field can indicate punctured RUs and assign all remaining RUs to the same STA. The HE-SIG-B field is the field that carries information about multiuser transmission. The HE-SIG-B field is not present in other formats, for example, SU PPDU format may not carry the HE-SIG-B field.

UL can also use the HE MU PPDU for SU preamble puncture transmission. In this case, in the HE-SIG-B user specific field, an AP identifier (ID) is sent instead of an STA ID.

The approach that involves using HE MU PPDU format for SU preamble puncture may have the benefits that it requires fewer modifications to existing IEEE specifications and may be backward compatible. On the other hand, this approach may require a higher preamble overhead and may only support a subset of all possible puncture modes due to the limitations in [1 2 1 2] structure of the HE-SIG-B field. The [1 2 1 2] structure means that channels 1 and 3 will carry the same HE-SIG-B information or content, and channels 2 and 4 will carry the same HE-SIG-B information or content for reliability purposes.

The HE MU PPDU format in FIG. 2 may provide two points of information. One point being that pre-HE modulated preamble is transmitted per 20 MHz. That is, until HE-SIG-B, all blocks are transmitted per 20 MHz. Another point being that it is also possible to puncture in more refine ways (see e.g., HE-STF, HE-LTFs, HE data).

FIG. 3A shows a diagram 300 illustrating examples of a first preamble puncturing mode for 80 MHz transmissions and a second preamble puncturing mode for 80 MHz transmissions. In the first preamble puncturing mode a secondary 20 MHz (S20) channel is punctured and in the second preamble puncturing mode a secondary 40 MHz left (S40-L) channel or a secondary 40 MHz right (S40-R) channel is punctured.

FIG. 3B shows a diagram 310 illustrating examples of a third preamble puncturing mode for 160 MHz transmissions and a fourth preamble puncturing mode for 160 MHz transmissions. In the third preamble puncturing mode a secondary 20 MHz (S20) channel is punctured and in the fourth preamble puncturing mode a secondary 40 MHz left (S40-L) channel, a secondary 40 MHz right (S40-R) channel, or both are punctured.

The preamble puncturing modes shown in FIGS. 3A and 3B are but a limited number of all possible puncturing modes that can be used for preamble puncturing for SU transmissions.

As described above, another approach may involve the use of management frames to signal different preamble puncturing modes or puncture patterns. This approach is different from indicating a puncture pattern in a per-packet basis. This approach may have more flexibility than the one described above that involves the use of HE MU PPDU format because it may support a wider range of puncturing modes or puncture patterns.

Figure 4:
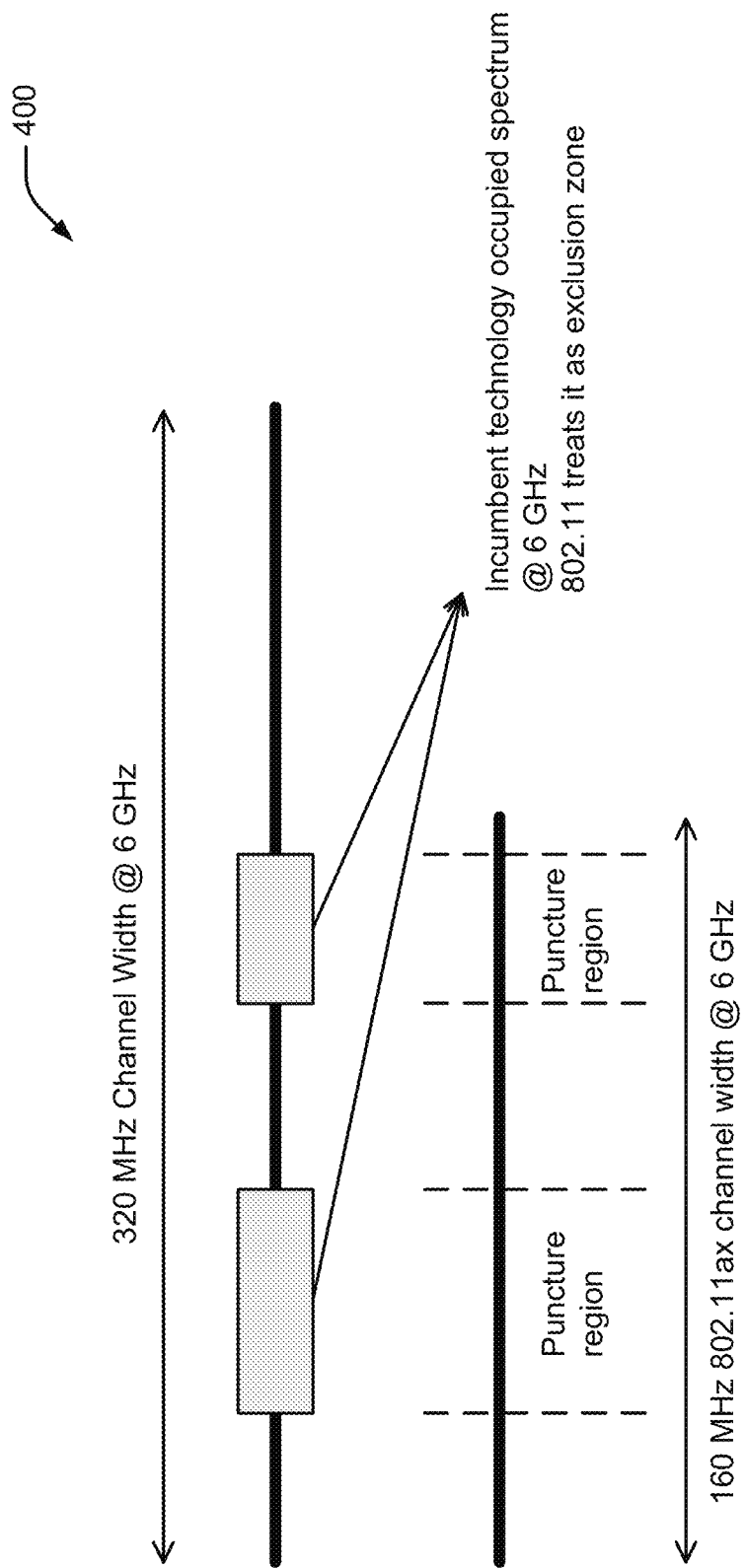
FIG. 4 is a schematic diagram illustrating an example of puncture regions due to incumbent technologies.

FIG. 4 shows a diagram 400 illustrating an example of puncture regions (or bandwidth exclusion zones) that are needed in a 320 MHz channel width at 6 GHz due to incumbent technologies for 160 MHz channel width IEEE 802.11ax transmissions at 6 GHz. The regions (e.g., frequency bands) occupied by incumbent technologies need to be punctured to avoid interfering with the existing technologies.

Figure 5:
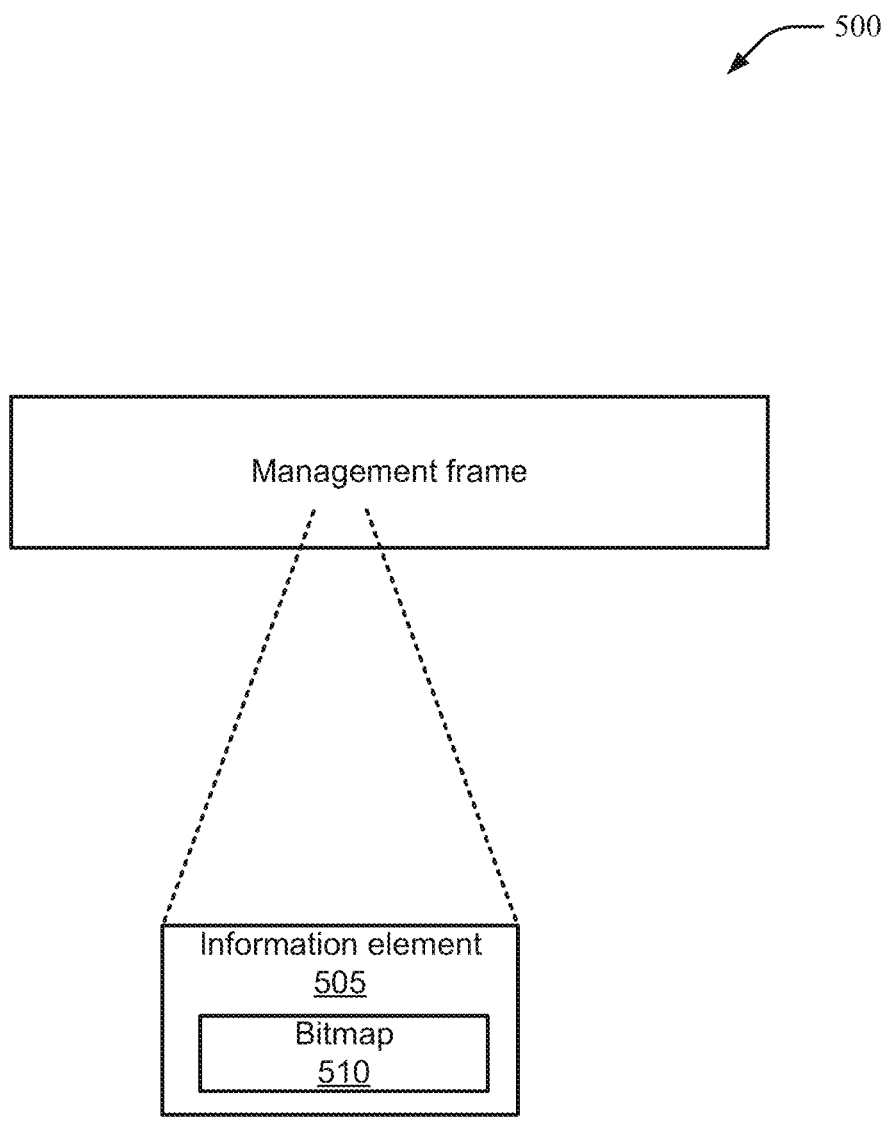
FIG. 5 is a schematic diagram illustrating an example of a management frame in accordance with aspects of the present disclosure.

As noted above, one approach to indicate the puncturing regions is to signal a puncture pattern using management frames (see e.g., management frame 500 in FIG. 5). For example, a puncture pattern (which indicates the regions of incumbent technologies) is signaled by an AP in the BSS by transmitting puncture pattern information through management frames. Examples of management frames can be beacons, association response frames, management action frames, and the like.

In such signaling the preamble puncture pattern is semi-static, that is, it does not vary on a per-packet basis. A semi-static puncture pattern is acceptable since in 6 GHz the incumbent technologies may occupy a portion of the bandwidth for longer periods of time. When there is a change in the puncture region, the AP can signal the new puncture pattern through management frames in the BSS. It is possible that a range from about 5.9 GHz to about 7.1 GHz may be made into an unlicensed spectrum, in which case any incumbent technologies in that range will need to be protected from interference from WLAN.

One aspect of this approach is the preamble puncture signaling information format. An AP 105 may announce through management frames the operating bandwidth of the BSS 110 (e.g., 160 MHz). The primary 20 MHz (e.g., P20 channel) channel is also advertised within the BSS 110. Per-packet bandwidth may also be indicated in the preamble (e.g., HE-SIG-A) of the packet. It can be less than or equal to the 160 MHz operating bandwidth of the BSS 110. The P20 channel may not be punctured since the P20 channel is the anchor channel on which all control information is exchanged. The AP 105 can relocate the P20 channel if the P20 channel falls in an exclusion zone.

The AP 105 may also announce through management frames the preamble puncture pattern. For example, the puncture pattern can be indicated as a bitmap of 7 bits, indicating the puncture status of each of the 7 non-primary 20 MHz channels in 160 MHz (note that the primary 20 MHz channel is not punctured so it need not be included in the bitmap). In another example, the puncture pattern granularity can be finer (e.g., 10 MHz), in which case one way of signaling is through a 14 bit bitmap. Finer granularity of puncture pattern provides flexibility in puncturing bandwidth efficiency.

FIG. 5 shows the management frame 500, which may be a beacon, an association response frame, or a management action frame, for example. The management frame 500 may include a field or information element (IE) 505 in which the bitmap described above providing the puncture pattern information can be included.

Other aspects associated with the approach of using management frames (e.g., management frame 500) to signal preamble puncturing include the behavior of a transmitter and a receiver in the signaling operation and the implication of clear channel assessment rules.

The transmitter (e.g., AP 105) may use HE SU PPDU or HE MU PPDU format for transmission. That is, in contrast to the other approaches described above that involves only HE MU PPDU format, the PPDU format need not be a limitation in the implementation in this approach. Moreover, for the transmitter, the preamble of PPDUs is unchanged from what is currently supported in the IEEE 802.11ax specification. That is, the bandwidth field in the HE-SIG-A field is set as if no puncturing is being done. The transmitter zeros out the punctured sub-carriers based on puncturing knowledge provided by management frames periodically.

A component (e.g., modem 2214 and/or preamble puncturing component 2250) of the receiver (e.g., STA 115) may use the preamble of the PPDU received and the puncturing information from management frames to demodulate the received packet.

Regarding the implications on the Clear Channel Assessment (CCA) rules, for HE SU PPDU format current IEEE 802.11ax CCA rules require BUSY/IDLE status report for P20 and S20 in 40 MHz, P40 and S40 in 80 MHz, and P80 and S80 in 160/80+80 MHz, but there is no status report for 20 MHz. Accordingly, to enable the approach of using management frames to signal puncturing information, CCA BUSY/IDLE status report per 20 MHz channel may be needed. For an HE MU PPDU format current IEEE 802.11ax CCA rules already require CCA BUSY/IDLE status report per 20 MHz channel and, therefore, no change to CCA policy may be needed for HE MU PPDU.

For a transmitter, regardless of CCA BUSY or IDLE status, the 20 MHz sub-channels that belong to the exclusion zone (punctured channels) are zeroed out in the preamble puncture transmission.

An operating example of the technique or approach described above includes having an AP (e.g., AP 105) start its BSS and advertise or broadcast the preamble puncture pattern in management frames (e.g., beacons, management action frames, association response frames). The AP 105 (e.g., the transmitter) may set the bandwidth=160 MHz in HE-SIG-A of the preamble. The AP 105 knows about the preamble puncture pattern and hence zeros out the punctured channels (e.g., no preamble and data is modulated on the punctured sub-carriers). A component (e.g., modem 2214 and/or preamble puncturing component 2250) of the STA or receiver (e.g., STA 115) decodes the incoming packet taking into account the preamble puncture pattern, of which it is aware because of the management frames.

The approach described above, in which management frames are used to indicate a puncture pattern, provides for a long-term or semi-static scheme rather than a per-packet scheme. Moreover, the puncture patterns are not limited to a few modes but a much wider set of puncture patterns can be supported. Also, this approach need not depend on whether an HE MU PPDU format is used or an HE SU PPDU format is used.

Figure 6:
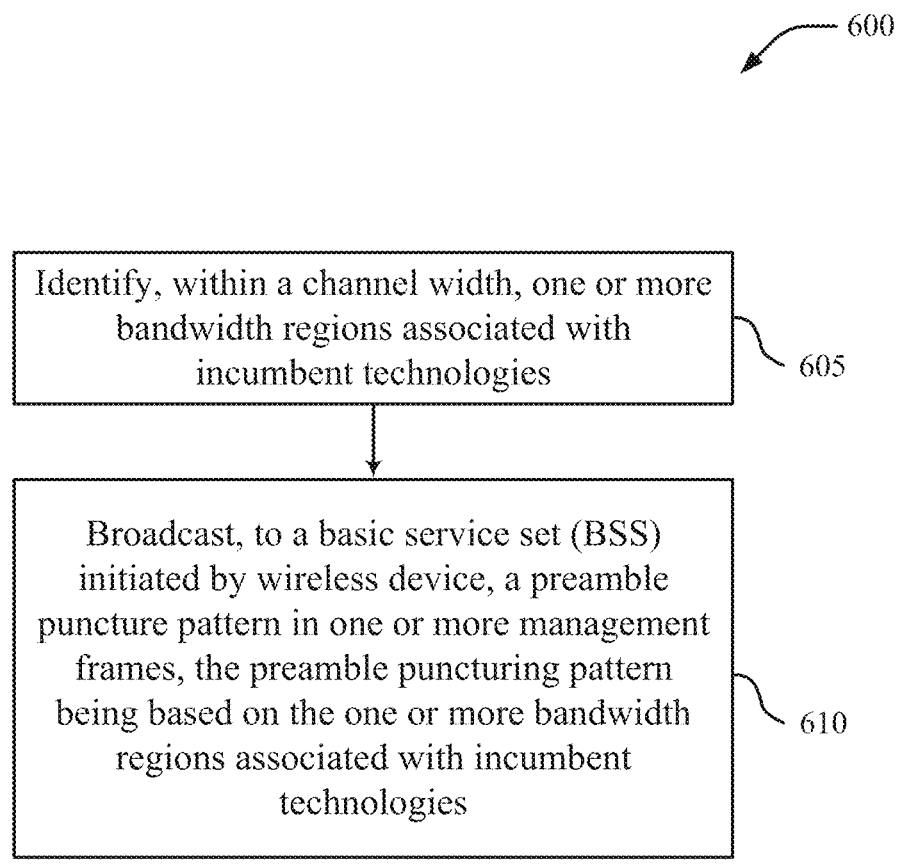
FIG. 6 is a flow diagram illustrating an example of a method in accordance with aspects of the present disclosure.

FIG. 6 is a flow diagram illustrating an example of a method 600 in accordance with aspects of the present disclosure. Aspects of the method 600 may be performed by one or more components of the AP 105 shown in FIG. 18, including but not limited to processors 1812, a modem 1814, a transceiver 1802, a memory 1816, a radio frequency (RF) front end 1888, a preamble puncturing component 1850, a management frames puncture pattern signaling component 1860, and/or a preamble overhead reduction component 1870. The management frames puncture pattern signaling component 1860 may include one or more subcomponents such as a bandwidth region identifying component 1862 and/or a preamble puncture pattern broadcast component 1864 that are configured to perform specific functions, actions, or processes associated with the method 600.

At 605, the method 600 may include identifying, within a channel width, one or more bandwidth regions associated with incumbent technologies or bandwidth exclusion zones. For example, one or more components (e.g., bandwidth region identifying component 1862) of the AP 105 may identify, within a channel width, one or more bandwidth regions associated with incumbent technologies or bandwidth exclusion zones. The AP 105 may identify the one or more bandwidth regions based on frequency bands used by already present, existing, or established wireless technologies that WLAN communications need to avoid interfering with or with which interference is to be minimized.

At 610, the method 600 includes broadcasting, to a BSS initiated by the access point, a preamble puncture pattern in one or more management frames, the preamble puncture pattern being based on the one or more bandwidth regions associated with incumbent technologies. For example, one or more components (e.g., preamble puncture pattern broadcast component 1864) of the AP 105 may broadcast, to a BSS, a preamble puncture pattern in a management frame.

In another aspect of the method 600, the method 600 further includes setting, for a packet to be transmitted, a bandwidth in an HE-SIG-A field of a preamble of the packet.

In another aspect of the method 600, the method 600 further includes zeroing out one or more channels for transmission of the packet based on the preamble puncture pattern.

In another aspect of the method 600, the one or more management frames include a beacon, an association response frame, or a management action frame.

In another aspect of the method 600, the one or more management frames include a bitmap indicating the preamble puncture pattern. The bitmap may be included in an information element.

In another aspect of the method 600, the method 600 further includes transmitting a packet based on the preamble puncture pattern, the packet having an HE SU PPDU format or an HE MU PPDU format.

In another aspect of the method 600, the one or more management frames indicate an operating bandwidth of the BSS.

In another aspect of the method 600, the method 600 further includes identifying a change in the one or more bandwidth regions associated with incumbent technologies; and broadcasting, to the BSS initiated by the access point, a different preamble puncture pattern in one or more additional management frames, the different preamble puncture pattern being based on the change in the one or more bandwidth regions associated with incumbent technologies. For example, the AP 105 may identify a change in the one or more bandwidth regions associated with incumbent technologies based on a change in the preamble puncture pattern from semi-static puncture pattern. In another aspect of the method 600, the broadcasting of the one or more management frames includes periodically broadcasting the one or more management frames.

In another aspect of the method 600, the method 600 further includes DL SU preamble puncturing for a particular client of the access point based at least in part on the advertising of the preamble puncture pattern in the one or more management frames, wherein the particular client of the access point has allocated more than one resource unit.

Figure 7:
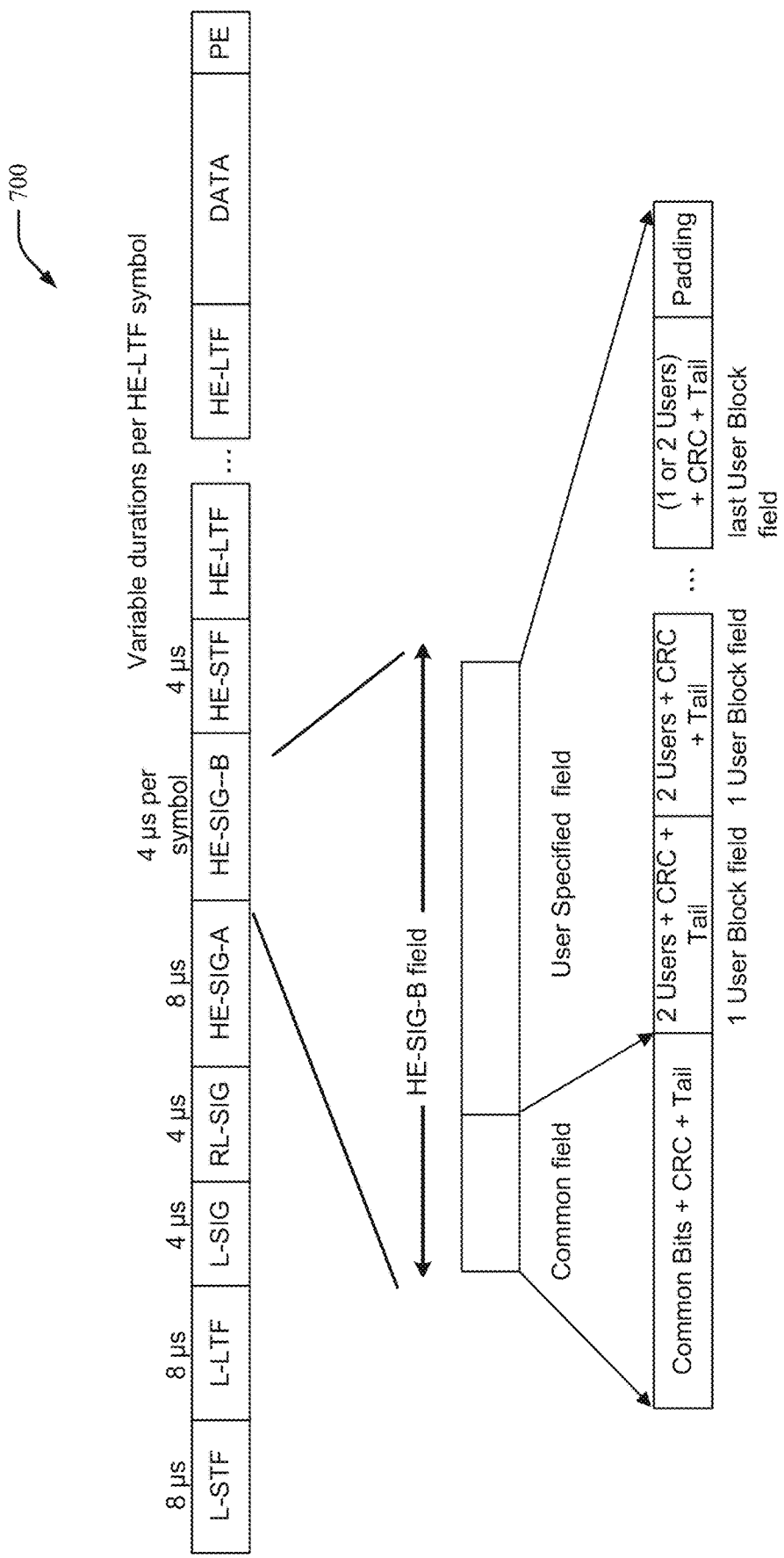
FIG. 7 is a schematic diagram illustrating an example of a SIG-B field in a MU PPDU format.

As described above, this disclosure describes two approaches to enable SU preamble puncturing, one approach involves the use of management frames and the other approach involves the use of the HE MU PPDU format shown in FIG. 2. FIG. 7 illustrates a diagram 700 providing details of an HE-SIG-B field in the HE MU PPDU format as currently implemented in IEEE 802.11ax. The HE-SIG-B field is separately encoded on each 20 MHz band. The encoding structure in one such 20 MHz band is shown in FIG. 7. The HE-SIG-A in the HE MU PPDU format indicates the bandwidth mode.

The HE-SIG-B includes a common field and a user specific field. The common field includes information regarding resource unit allocation (RU allocation subfield/RU table) such as the RU assignment in frequency domain, the RUs allocated for MU-MIMO and the number of users in MU-MIMO. A diagram 1100 in FIG. 11 illustrates an example of a common field format. Diagrams 1200, 1210, and 1220 in FIGS. 12A-12C provide an example of an RU allocation subfield.

The user specific field includes zero or more user blocks followed by padding (if present). Each user block includes at most two user fields. A diagram 1300 in FIG. 13 illustrates an example of a user field format for a non-MU MIMO allocation.

The HE-SIG-B has two content channels and adheres to [1 2 1 2] structure in which the content channels alternate as illustrated in diagrams 1400, 1410, 1420, and 1430 in FIGS. 14A-14D, respectively.

As noted above, the approach that uses the HE MU PPDU format, the existing HE-SIG-A/B signaling in MU preamble puncturing is reused. For example, HE-SIG-A field can indicate 4 preamble puncturing modes (described in more detail with respect to FIGS. 3A and 3B). Moreover, the HE-SIG-B field can indicate punctured RUs and assign all remaining RUs to the same STA.

UL can also use the HE MU PPDU for SU preamble puncture transmission. In this case, in the HE-SIG-B user specific field, an AP identifier (ID) is sent instead of an STA ID.

The approach that involves using a HE MU PPDU format for SU preamble puncture may have the benefits that the HE MU PPDU format for SU preamble puncture requires fewer modifications to the existing IEEE specifications and may be backward compatible. On the other hand, this approach may require a higher preamble overhead and may only support a subset of all possible puncture modes due to the limitations in [1 2 1 2] structure of the HE-SIG-B field.

Figure 8A:
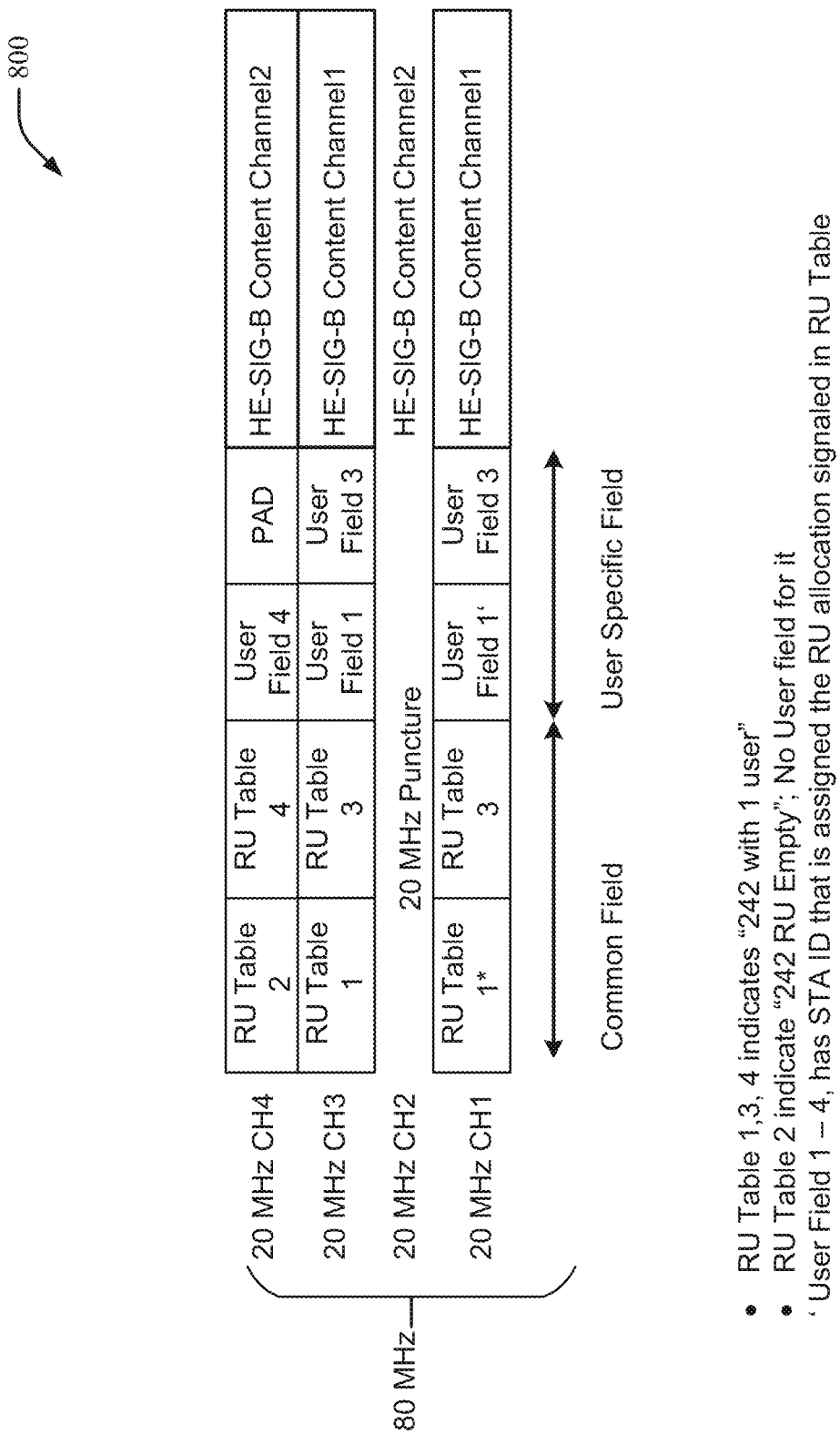
FIGS. 8A and 8B are diagrams illustrating examples of puncturing in 80 MHz and 160 MHz transmissions.
Figure 8B:
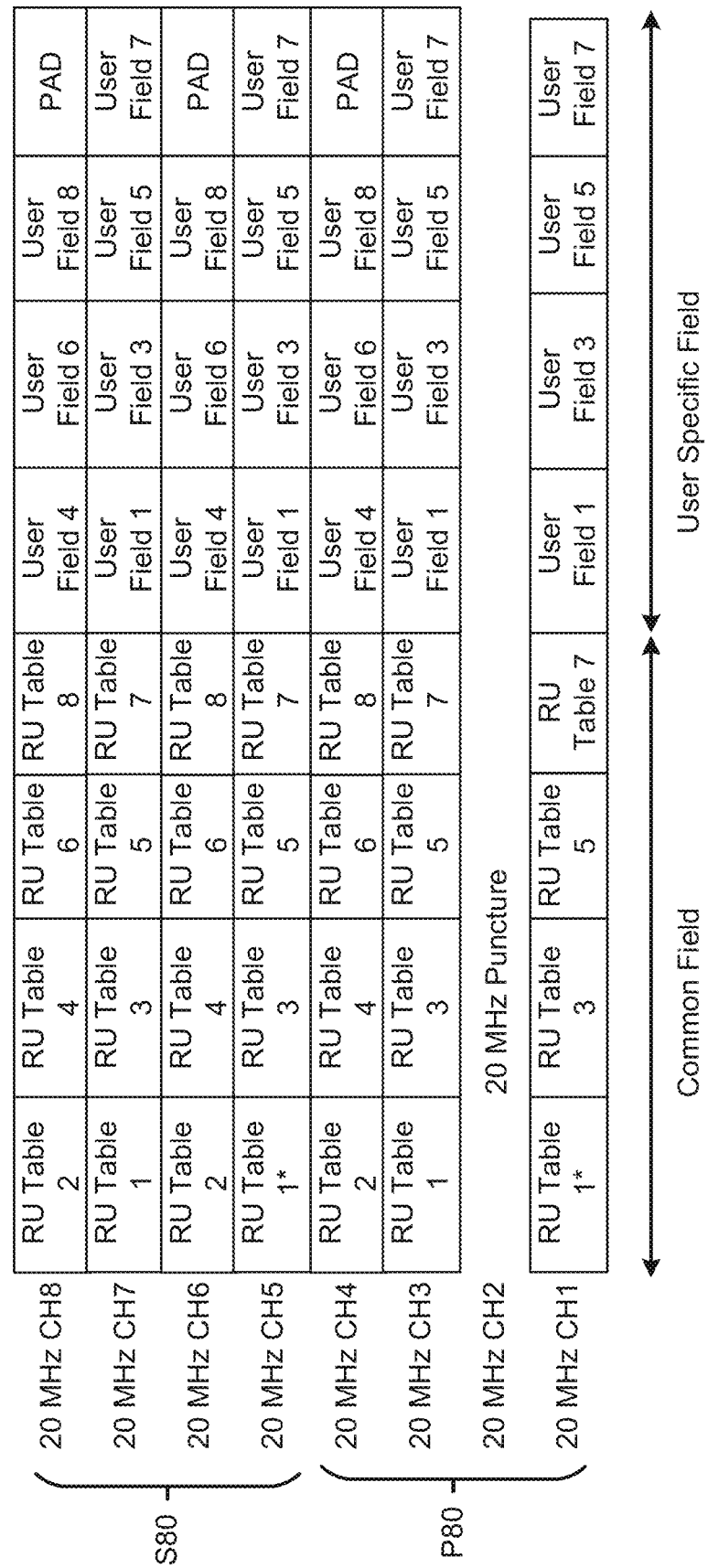

FIGS. 8A and 8B show diagrams 800 and 810 illustrating examples of puncturing in 80 MHz and 160 MHz transmissions as it is currently supported in IEEE 802.11ax. The diagram 800 shows an example of S20 in 80 MHz transmission being punctured (bandwidth field=4 in HE-SIG-A). User fields 1, 3, and 4 contain the same information because of identical modulation coding scheme (MCS), coding, number of streams (NSTS) used in all RUs assigned to the same STA. Moreover, RU tables 1, 3, and 4 indicates "242 with 1 user" and RU table 2 indicates "242 RU Empty" with no user field for it. User fields 1-4 have STA ID that is assigned by the RU allocation signaled in the RU table.

The diagram 810 shows an example of S20 in 160 MHz transmission being punctured (bandwidth field=6 in HE-SIG-A). RU tables 1, 3, 4, 5, 6, and 7 indicate "242 with 1 user" and RU table 2 indicates "242 RU Empty" with no user field for it. The user fields 1-8 have STA ID that is assigned by the RU allocation signaled in the RU table.

In each of the cases shown in the diagrams 800 and 810, a single user field per content channel may be sufficient in case of SU preamble puncture using HE MU PPDU format as is described below.

Figure 9:
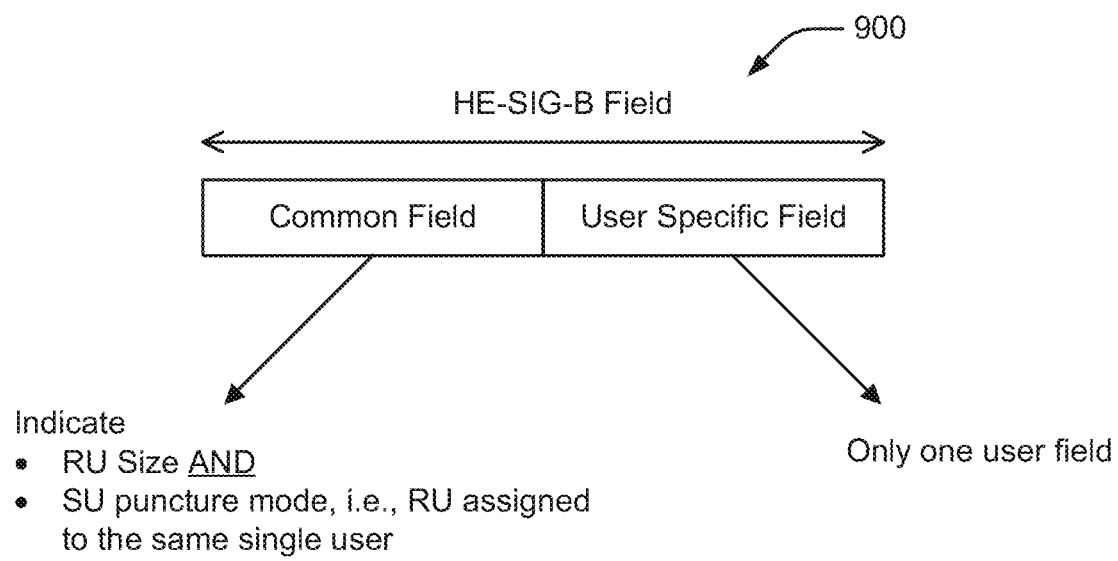
FIG. 9 is a schematic diagram illustrating an overhead reduction technique for single user (SU) preamble puncturing in accordance with aspects of the present disclosure.

FIG. 9 shows a diagram 900 that illustrates an overhead reduction technique for SU preamble puncturing in accordance with aspects of the present disclosure. To reduce the number of user fields in the user specific field of the HE-SIG-B, the common field may indicate not only the RU size but may also indicate the SU puncture mode, that is, the RU assigned to the same single user. With such an approach, a single user field may be needed, thus reducing the overall size of the user specific field of the HE-SIG-B field.

New entries may need to be defined in the RU allocation subfield (see e.g., FIGS. 12A-12C) to indicate the SU puncture mode. Examples of these entries may include, but need not be limited to: 242 SU puncture mode, 484 SU puncture mode, 996 SU puncture mode, L106 empty, R106 SU puncture mode, and L106 SU puncture mode with R106 empty.

Thus, changes to the common field to support SU preamble puncturing may include the following aspects. A 'same single user' is assigned to the various 242 RUs and is indicated in the common field. That is, the common field may signal in an RU allocation subfield that each of 242 RU (20 MHz) is assigned to the same single user in the ≥80 MHz SU preamble puncture transmission using HE MU PPDU format. This is in contrast to the current approach where ownership of RU is determined through user field and not common field.

In an example, to facilitate finer granularity of SU punctured transmission, the RU allocation subfield may be used to signal that lower frequency 106 RU in 242 RU (8 MHz in 20 MHz) is punctured while the Higher frequency 106 RU in 242 RU is assigned to the same single user. In another example, the RU allocation subfield may be used to signal that higher frequency 106 RU in 242 RU is punctured while the lower frequency 106 RU in 242 RU is assigned to the same single user. Similar rules may be defined for 52 RU in 242 RU (4 MHz in 20 MHz). Reserved values present in the RU Allocation subfield can be used to indicate the above values or signaling.

Figure 10A:
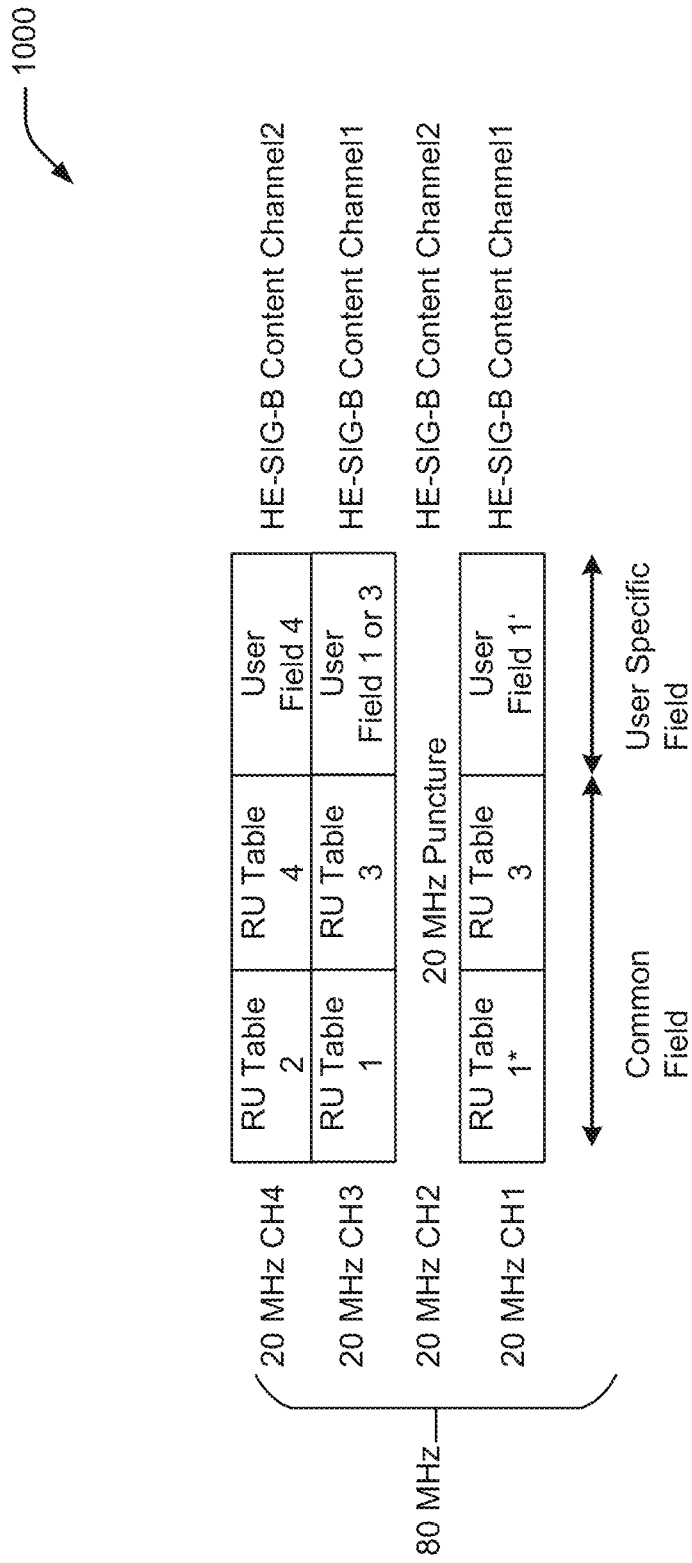
FIGS. 10A and 10B are diagrams illustrating examples of overhead reduction in puncturing in 80 MHz and 160 MHz transmissions.
Figure 10B:
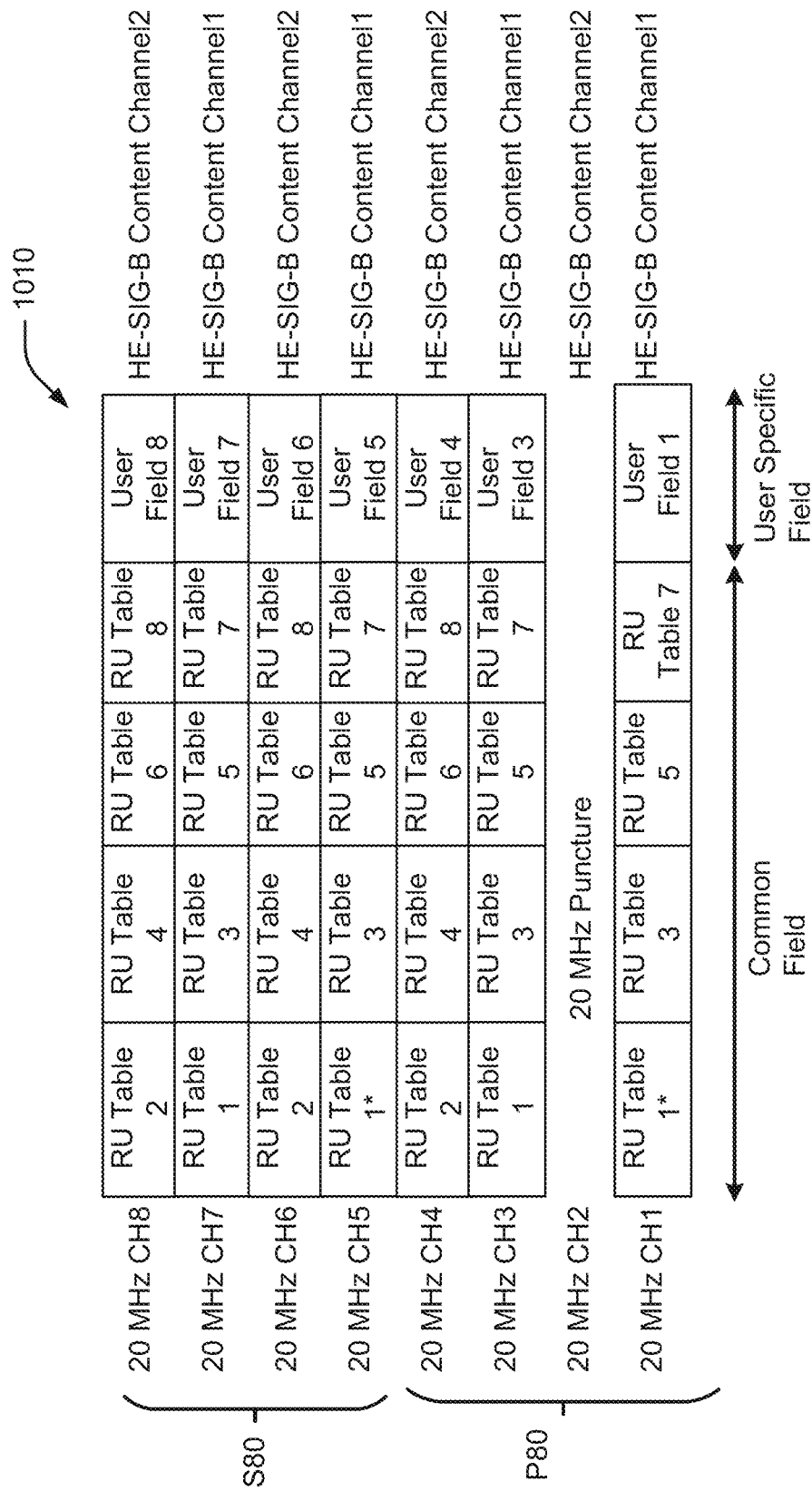
Figure 14A:
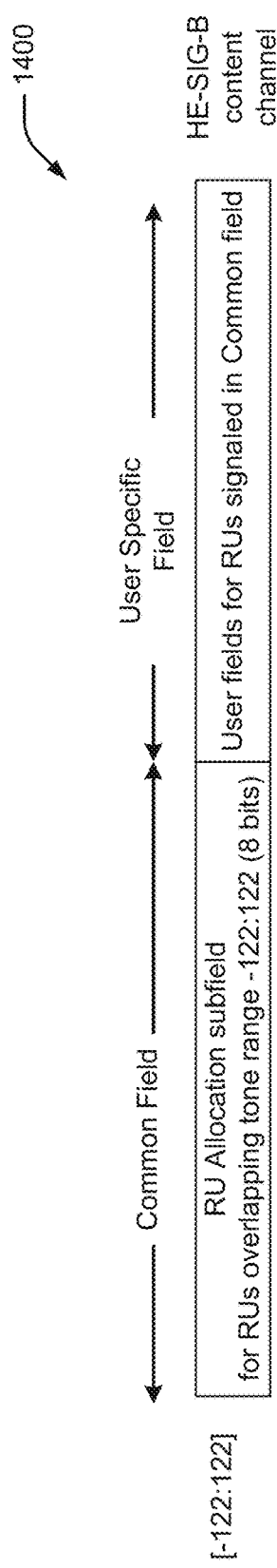
FIGS. 14A-14D are diagrams illustrating examples of SIG-B content channel.
Figure 14B:
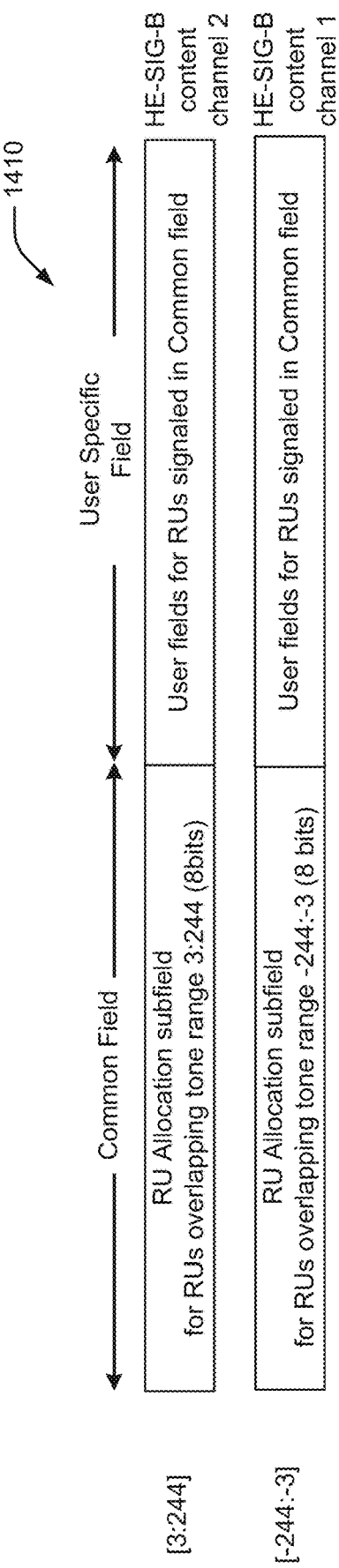
Figure 14C:
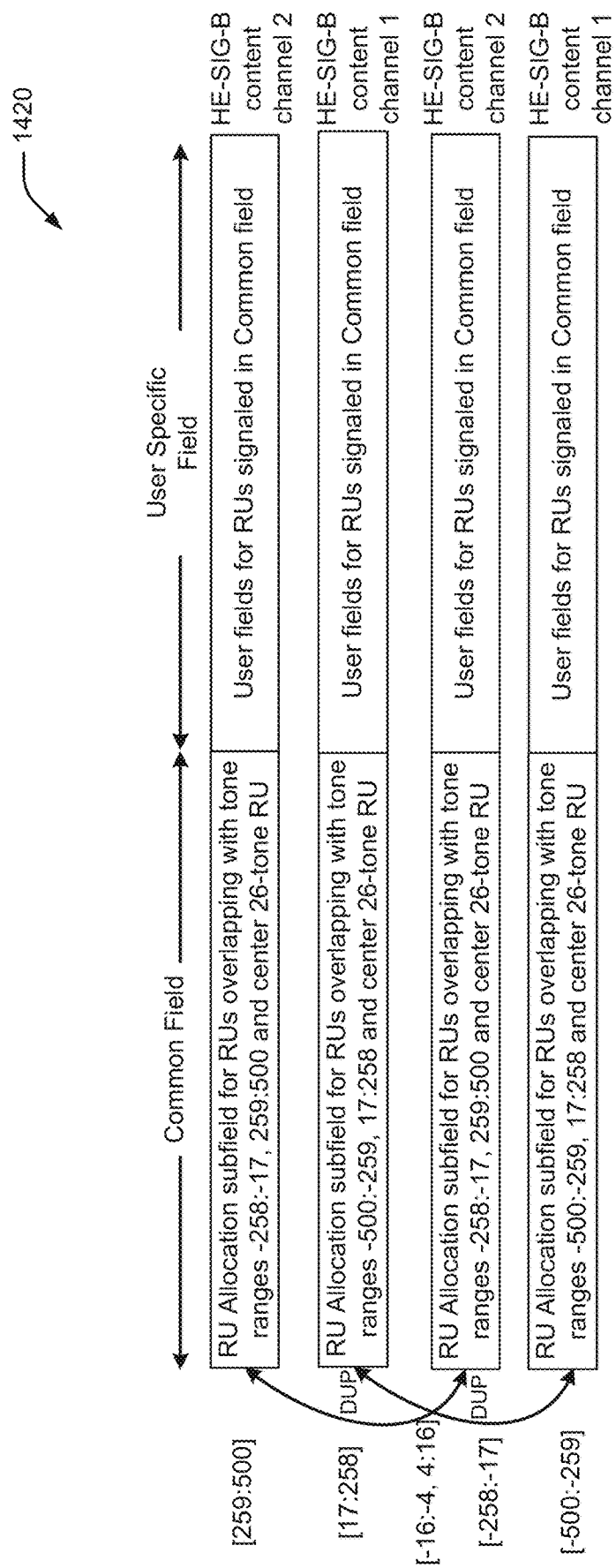
Figure 14D:
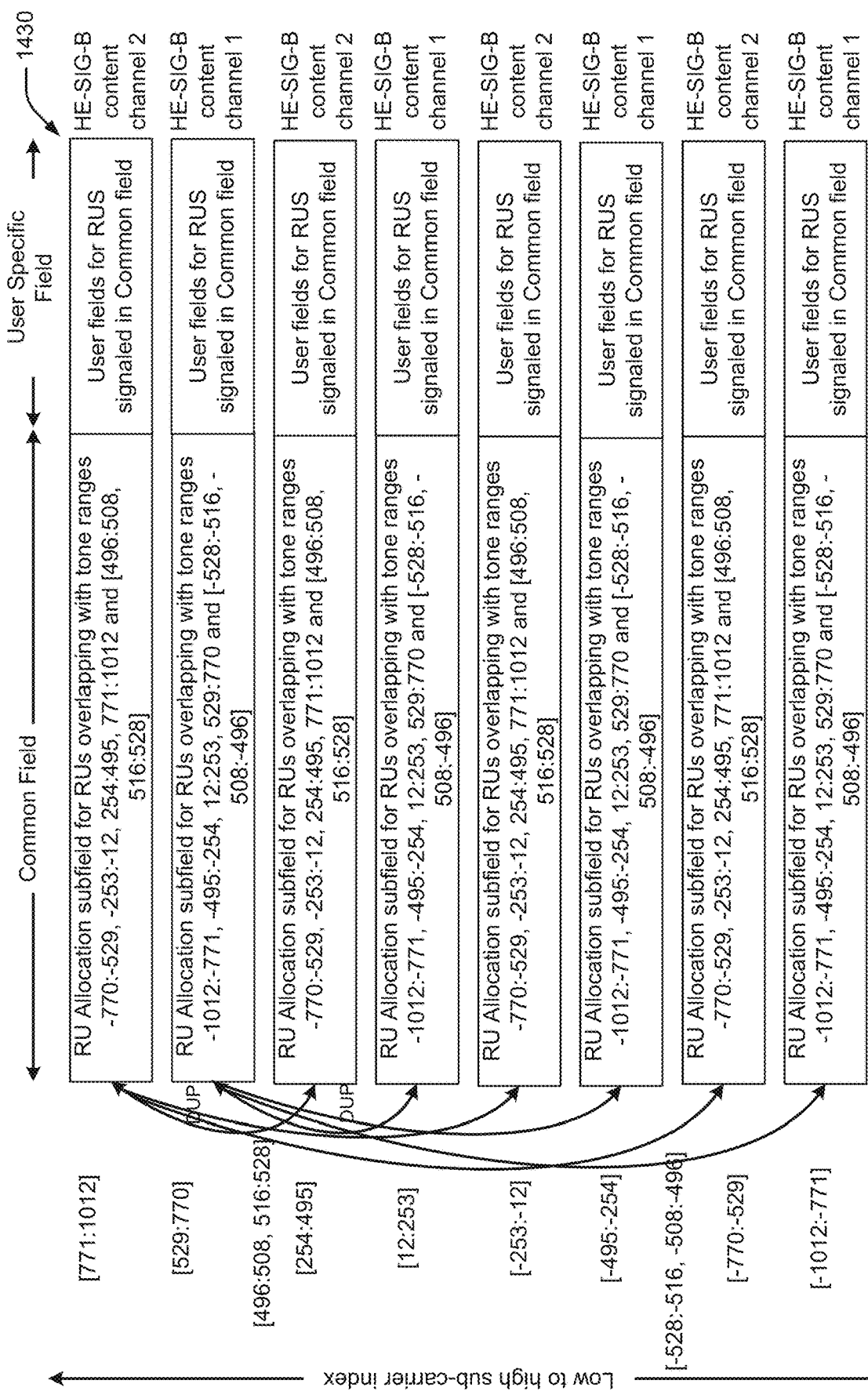

FIGS. 10A and 10B show diagrams 1000 and 1010 illustrating examples of overhead reduction when puncturing in 80 MHz and 160 MHz transmissions based on the approach described above for changing the information provided in the common field of the HE-SIG-B field. The diagram 1000 shows an example of S20 in 80 MHz transmission being punctured (bandwidth field=4 in HE-SIG-A). RU tables 1-4 indicate "242 assigned to the same single user" and user field 1 has STA ID that is assigned by the RU allocation signaled in the RU tables 1-4. In contrast to the example in FIG. 8A, there is a single user field. The overhead for the user field is reduced for 80 MHz SU punctured transmission by 50% compared to current IEEE 802.11ax configurations.

The diagram 1010 shows an example of S20 in 160 MHz transmission being punctured (bandwidth field=6 in HE-SIG-A). RU tables 1-8 indicate "242 assigned to the same single user" and user field 1 has STA ID that is assigned by the RU allocation signaled in RU tables 1-8. All user fields in this example are identical. Therefore, whether user field n (n=2 to 8) is transmitted or user field 1 is transmitted in a content channel is not important. The overhead for the user field is reduced for 160 MHz SU punctured transmission by 75% compared to current IEEE 802.11ax configurations.

In addition to the various techniques described above, there may be other methods, schemes, or approaches that can be used for SU preamble puncture indication. As noted above, an HE MU PPDU may be used for indicating SU preamble puncture, where the HE MU PPDU includes a common information field and per user information fields. This approach can work without having to make substantial changes by reusing existing framework of MU puncturing. However, this approach can result in the introduction of some overhead. An MU PPDU is used for SU preamble puncture indication instead of using an SU PPDU because current specifications (e.g., IEEE 802.11ax) only allow puncturing when using a MU tone plan. That is, based on current puncturing standards, SU preamble puncturing cannot be performed using an SU tone plan and needs instead an MU tone plan. Accordingly, an MU PPDU is naturally used for SU preamble puncture indication because an MU PPDU comes with the MU tone plan. Thus, even though an SU PPDU format may be more efficient than an MU PPDU format, an SU preamble puncture indication is performed using an MU PPDU.

In some of the approaches described above, the HE-SIG-A field of the HE MU PPDU is used to indicate pre-defined puncture patterns. The HE-SIG-B of the HE MU PPDU can be used to further refine the puncture pattern. In such approaches, the common field indicates RU sizes and allocation to a number of users, while the per user field identifies each user that is assigned an RU. The per user field provides info on MCS, NSTS, coding, etc.

In an additional approach, described below, the existing framework for MU puncturing is maintained or reused but provides an optimization of the overhead. In this approach, the HE MU PPDU is used for SU preamble puncture transmissions. However overhead of the HE-SIG-B signaling may be reduced by the following features: (1) the HE-SIG-A field is used to indicate that an incoming transmission is an SU preamble punctured transmission; (2) the puncture pattern is indicated in a management frame rather than in the HE-SIG-A field and the HE-SIG-B field; (3) the common field is absent or not present in such transmissions; and (4) only one per user field is present in each content channel.

Figure 15A:
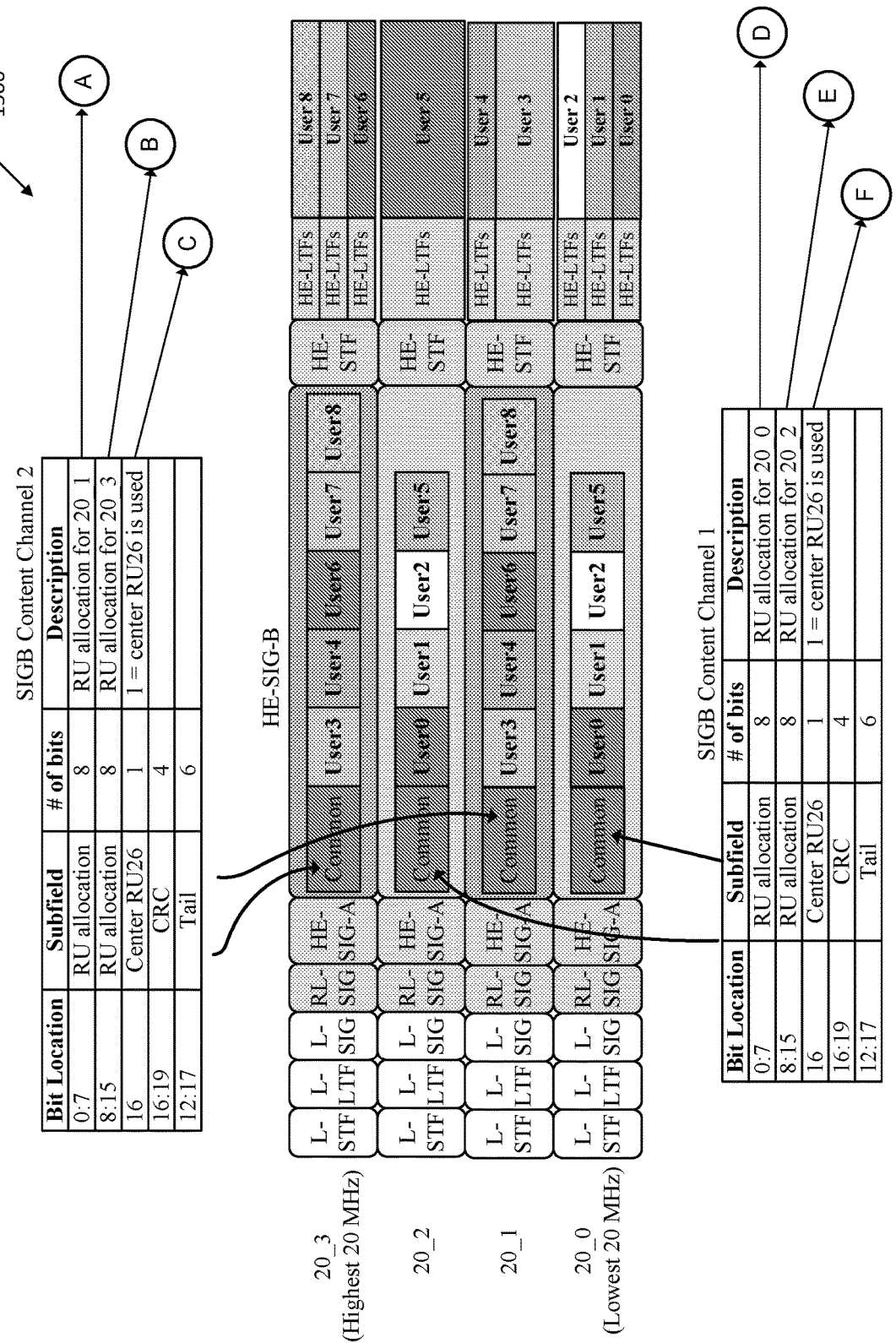
FIG. 15A-15B is a diagram illustrating a current high efficiency (HE) MU PPDU structure.
Figure 15B:
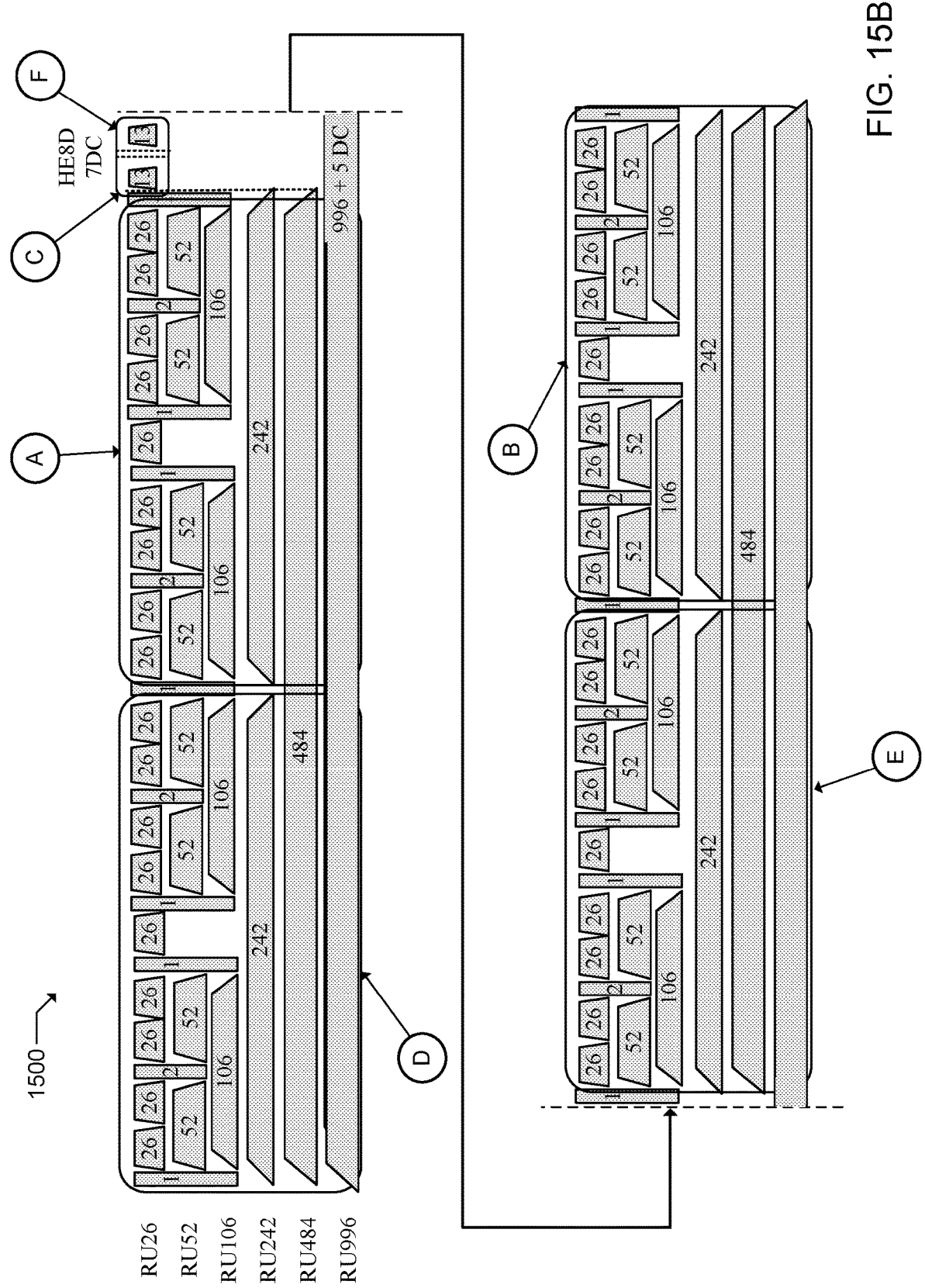

FIG. 15A-15B is a diagram 1500 illustrating a current HE MU PPDU structure. In this diagram, an example is shown in which an 80 MHz HE MU PPDU is being transmitted, which is required to have 4 common information fields corresponding to each of the 20 MHz channels, as well as multiple per user fields. This example shows that using the HE MU PPDU for SU preamble puncture indication can incur a significant overhead.

Figure 15C:
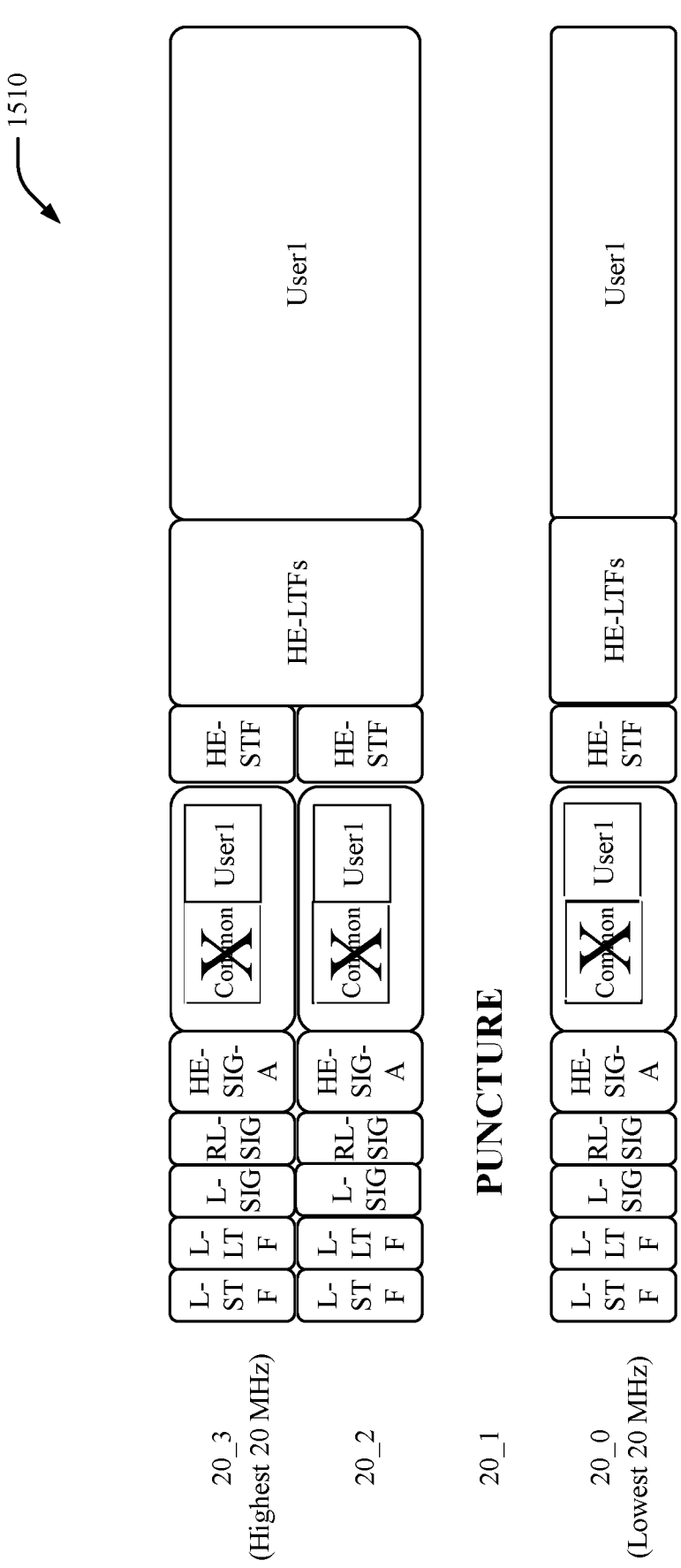
FIG. 15C is a diagram illustrating another technique for SU preamble puncture transmission with HE MU PPDU.

FIG. 15C is a diagram 1510 illustrating another technique for SU preamble puncture transmission with HE MU PPDU in which the 20_1 20 MHz channel is punctured, the common field is absent or not present, and only a single per user field is present in each content channel. In this case, the HE MU PPDU has a reduced or optimized overhead when compared to the HE MU PPDU shown in FIGS. 15A-15B.

As described above, for this additional approach, the HE-SIG-A field can be used to indicate incoming transmission is SU Preamble punctured transmission. Currently, when the SIGB compression subfield (e.g., bit) in the HE-SIG-A of the HE MU PPDU is set to "1", it indicates that the HE MU PPDU is a FULL bandwidth MU-MIMO transmission, that is, no puncture. The common field is absent and only per user fields are present. Moreover, the bandwidth subfield values 0-3 for 20/40/80/160 MHz are applicable, while values 4-7 that indicate punctures are not applicable.

Instead of using the SIGB compression subfield in this manner, in this additional approach, the SIGB compression subfield may be set to a predetermined number (e.g., "1") and the bandwidth value may be set to a predetermined value (e.g., 4 or 5). In some examples, setting the SIGB compression subfield to the predetermined number (e.g., "1") and the bandwidth value a first predetermined value (e.g., 4) may indicate SU Preamble puncture 80 MHz PPDU. In some examples, setting the SIGB compression subfield to the predetermined number (e.g., "1") and the bandwidth value a second predetermined value (e.g., 5) may indicate SU Preamble puncture 160/80+80 MHz PPDU. In some examples, some of the bandwidth values (e.g., 6 and 7) can be reserved. In this example, when these conditions are met, a new rule may be defined in which only one per user field is used for each content channel. In this case, the content of the per user field can be identical (e.g., same MCS, coding, DCM). In addition, as described above, the puncture pattern information can be distributed in a management frame.

This additional approach for SU preamble puncture indication using HE MU PPDU not only reuses existing framework of MU puncturing but also allows for the reduction of signaling overhead.

Figure 16:
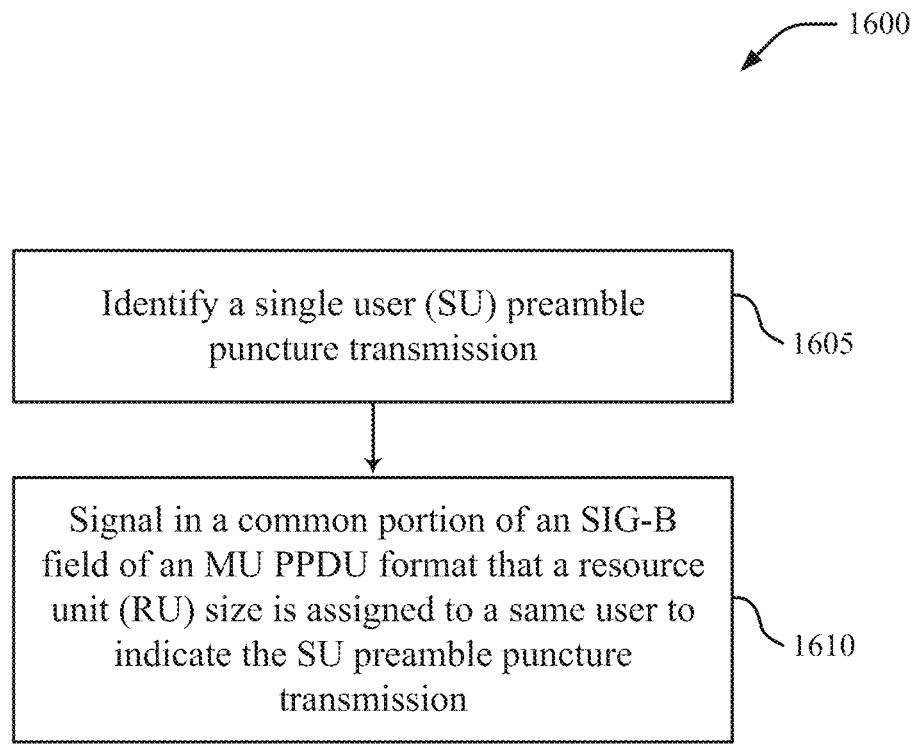
FIG. 16 is a flow diagram illustrating another example of a method in accordance with aspects of the present disclosure.

FIG. 16 is a flow diagram illustrating an example of a method 1600 in accordance with aspects of the present disclosure. Aspects of the method 1600 may be performed by one or more components shown in the AP 105 of FIG. 18, including but not limited to the processors 1812, the modem 1814, the transceiver 1802, the memory 1816, the RF front end 1888, the preamble puncturing component 1850, the management frames puncture pattern signaling component 1860, and/or a preamble overhead reduction component 1870. The preamble overhead reduction component 1870 may include one or more subcomponents, such as identifying component 1872 and/or signaling component 1874, that are configured to perform specific functions, actions, or processes associated with the method 1600.

At 1605, the method 1600 includes identifying a single user (SU) preamble puncture transmission. For example, one or more of the components (e.g., identifying component 1872) of the AP 105 may identify an SU preamble puncture transmission based on an RU allocation subfield indicating an SU puncture mode.

At 1610, the method 1600 includes signaling in a common portion of a SIG-B field of a MU PPDU format that an RU size is assigned to a same user to indicate the SU preamble puncture transmission. For example, one or more of the components (signaling component 1874) of the AP 105 may signal in a common portion of a SIG-B field of an MU PPDU (e.g., a HE-SIG-B field of an HE MU PPDU or a EHT-SIG-B field of an EHT MU PPDU) that an RU size is assigned to a same user to indicate the SU preamble puncture transmission.

In another aspect of the method 1600, a user specific portion of the SIG-B field includes only a single user field for each channel.

In another aspect of the method 1600, the signaling in the common portion of a SIG-B field that the RU size is assigned to the same user is signaled by a value of an RU allocation subfield.

In another aspect of the method 1600, wherein having the signaling in the common portion of a SIG-B field that the RU size assigned to the same user includes signaling in an RU allocation subfield that a lower frequency 106 RU (8 MHz) in a 242 RU (20 MHz) is punctured while a higher frequency 106 RU in the 242 RU is assigned to the same user.

In another aspect of the method 1600, wherein having the signaling in the common portion of a SIG-B field that the RU size assigned to the same user includes signaling in an RU allocation subfield that a higher frequency 106 RU in a 242 RU is punctured while a lower frequency 106 RU in the 242 RU is assigned to the same user.

In another aspect of the method 1600, wherein having the signaling in the common portion of a SIG-B field that the RU size assigned to the same user includes signaling in an RU allocation subfield that a lower frequency 52 RU (4 MHz) in a 242 RU (20 MHz) is punctured while a higher frequency 52 RU in the 242 RU is assigned to the same user.

In another aspect of the method 1600, wherein having the signaling in the common portion of an HE-SIG-B field that the RU size assigned to the same user includes signaling in an RU allocation subfield that a higher frequency 52 RU in a 242 RU is punctured while a lower frequency 52 RU in the 242 RU is assigned to the same user.

In another aspect of the method 1600, wherein the SU preamble puncture transmission includes puncturing of a secondary 20 MHz (S20) channel in an 80 MHz transmission.

In another aspect of the method 1600, wherein the SU preamble puncture transmission includes puncturing of a secondary 20 MHz (S20) channel in a 160 MHz transmission.

Figure 17:
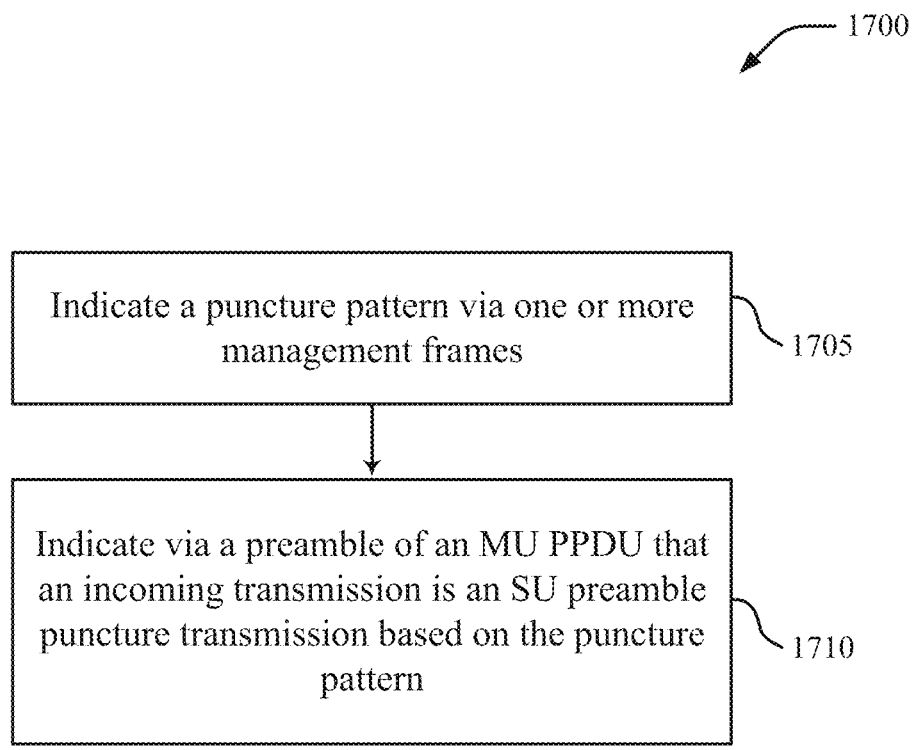
FIG. 17 is a flow diagram illustrating yet another example of a method in accordance with aspects of the present disclosure.

FIG. 17 is a flow diagram illustrating an example of a method 1700 in accordance with aspects of the present disclosure. Aspects of the method 1700 may be performed by one or more components of the AP 105 shown in FIG. 18, including but not limited to the processors 1812, the modem 1814, the transceiver 1802, the memory 1816, the RF front end 1888, the preamble puncturing component 1850, the management frames puncture pattern signaling component 1860, and/or a preamble overhead reduction component 1870.

At 1705, the method 1700 includes indicating a puncture pattern via one or more management frames. For example, one or more of the components (e.g., identifying component 1872) of the AP 105 may indicate a puncture pattern via one or more management frames.

At 1710, the method 1700 includes indicating via a preamble of an MU PPDU that an incoming transmission is an SU preamble puncture transmission based on the puncture pattern. For example, one or more of the components (signaling component 1874) of the AP 105 may indicate, via a preamble of an MU PPDU, that an incoming transmission is an SU preamble puncture transmission based on the puncture pattern.

In another aspect of the method 1700, the MU PPDU does not contain a common field.

In another aspect of the method 1700, only one per user field is present in each content channel of the MU PPDU.

In another aspect, the method 1700 may include indicating via the preamble of the MU PPDU that an incoming transmission is an SU preamble puncture transmission includes providing an indication in a SIG-A field.

In another aspect, the method 1700 may include indicating via the preamble of the MU PPDU that an incoming transmission is an SU preamble puncture transmission includes setting a SIGB compression bit and a bandwidth subfield value to indicate SU preamble puncture 80 MHZ PPDU or to indicate SU preamble puncture 160/80+80 MHz PPDU.

Figure 18:
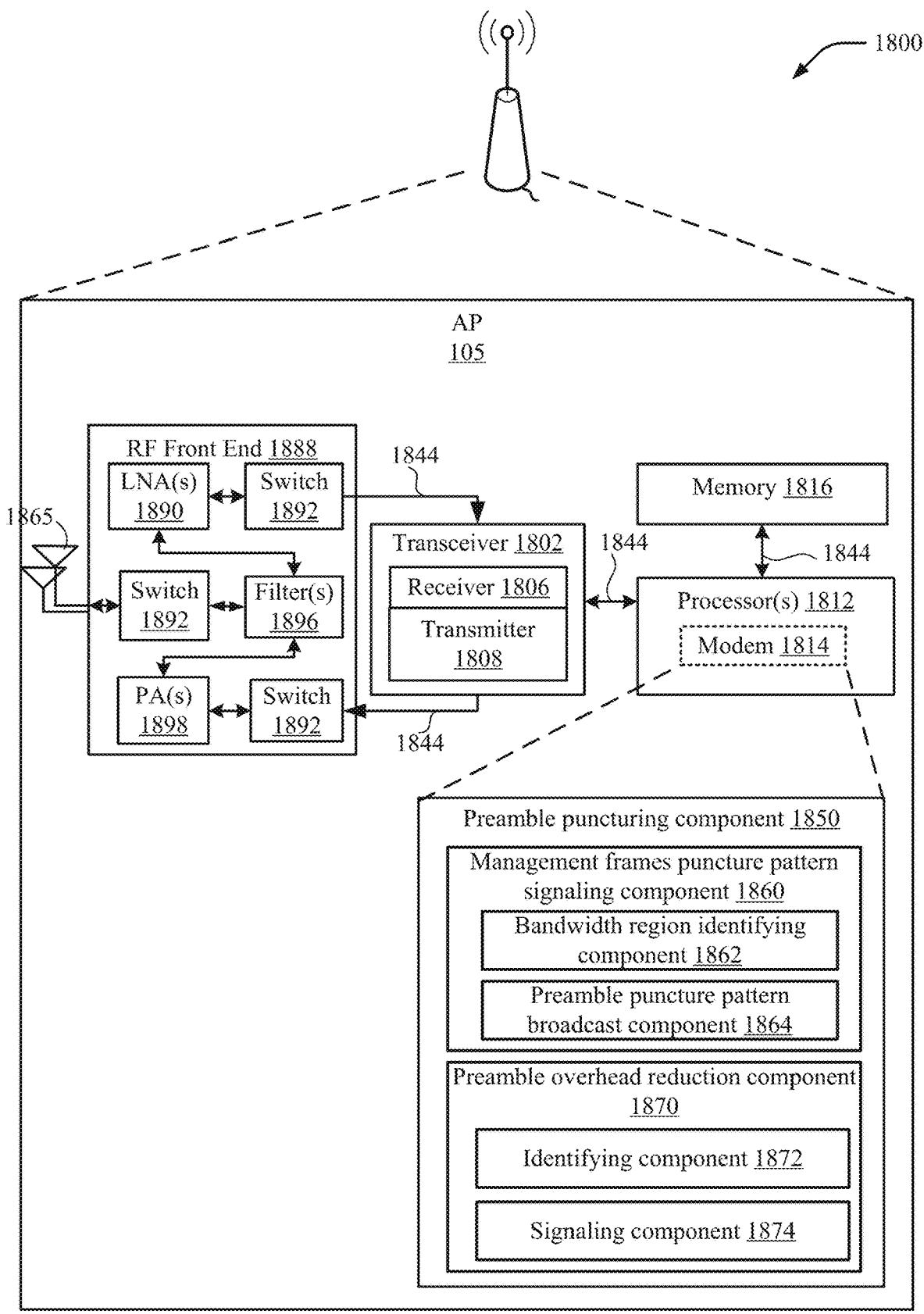
FIG. 18 is a schematic diagram illustrating an example of various components in an access point (AP) in accordance with various aspects of the present disclosure.

FIG. 18 describes hardware components and subcomponents of a wireless communications device (e.g., AP 105) for implementing the techniques for preamble puncturing provided by this disclosure. For example, one example of an implementation of the AP 105 (e.g., a transmitter) may include a variety of components, including components such as one or more processors 1812, the memory 1816, the transceiver 1802, and the modem 1814 in communication via one or more buses 1644, which may operate in conjunction with the preamble puncturing component 1850 to enable one or more of the functions described herein as well as one or more methods (e.g., methods 600 and 1600) of the present disclosure. For example, the one or more processors 1812, the memory 1816, the transceiver 1802, and/or the modem 1814 may be communicatively coupled via the one or more buses 1644. Further, the one or more processors 1812, the modem 1814, the memory 1816, the transceiver 1802, as well the RF front end 1888, may be configured to support preamble puncturing operations. In an example, the preamble puncturing component 1850 may support one or both of the approaches described above. When the preamble puncturing component 1850 supports the approach that involves the use of management frames, the preamble puncturing component 1850 may include and/or enable the management frames puncture pattern signaling component 1860. Similarly, when the preamble puncturing component 1850 supports the approach that involves the use of HE MU PPDU format, the preamble puncturing component 1850 may include and/or enable the preamble overhead reduction component 1870. When the preamble puncturing component 1850 supports both approaches, then the preamble puncturing component 1850 may include and/or enable both the management frames puncture pattern signaling component 1860 and the preamble overhead reduction component 1870. The management frames puncture pattern signaling component 1860 is configured to perform various functions, actions, operations, and/or processes associated with the use of management frames from the perspective of an AP. The preamble overhead reduction component 1870 is configured to perform various functions, actions, operations, and/or processes associated with signaling additional information in the common field of the HE-SIG-B field to reduce the overhead in the user specific field. The management frames puncture pattern signaling component 1860 and/or the preamble overhead reduction component 1870 can be configured to perform the additional approach described above for SU preamble puncture indication using HE MU PPDU with puncture indication in management frame.

In an aspect, the one or more processors 1816 may include the modem 1814 that may use one or more modem processors. The various functions related to the preamble puncturing component 1850 may be included in the modem 1814 and/or the one or more processors 1812 and, in an aspect, can be executed by a single processor, while in other aspects, different ones of the functions may be executed by a combination of two or more different processors. For example, in an aspect, the one or more processors 1812 may include any one or any combination of a modem processor, or a baseband processor, or a digital signal processor, or a transmit processor, or a receiver processor, or a transceiver processor associated with the transceiver 1802. In other aspects, some of the features of the one or more processors 1812 and/or the modem 1814 associated with the preamble puncturing component 1850 may be performed by the transceiver 1802.

Also, the memory 1816 may be configured to store data used herein and/or local versions of applications or the preamble puncturing component 1850 and/or one or more of its subcomponents being executed by at least one processor 1812. The memory 1816 can include any type of computer-readable medium usable by a computer or at least one processor 1812, such as random access memory (RAM), read only memory (ROM), tapes, magnetic discs, optical discs, volatile memory, non-volatile memory, and any combination thereof. In an aspect, for example, the memory 1816 may be a non-transitory computer-readable storage medium that stores one or more computer-executable codes defining the preamble puncturing component 1850 and/or one or more of its subcomponents, and/or data associated therewith, when the AP 105 is operating at least one processor 1812 to execute the preamble puncturing component 1850 and/or one or more of its subcomponents.

The transceiver 1802 may include at least one receiver 1806 and at least one transmitter 1808. The receiver 1806 may include hardware, firmware, and/or software code executable by a processor for receiving data, the code comprising instructions and being stored in a memory (e.g., computer-readable medium). The receiver 1806 may be, for example, an RF receiver. In an aspect, the receiver 1806 may receive signals transmitted by at least one wireless communications device (e.g., STA 115). Additionally, the receiver 1806 may process such received signals, and also may obtain measurements of the signals, such as, but not limited to, energy per chip to interference power ratio (Ec/Io), signal-to-noise ratio (SNR), reference signal received power (RSRP), received signal strength indicator (RSSI), etc. The transmitter 1808 may include hardware, firmware, and/or software code executable by a processor for transmitting data, the code comprising instructions and being stored in a memory (e.g., computer-readable medium). A suitable example of the transmitter 1808 may include, but is not limited to, an RF transmitter.

Moreover, in an aspect, the wireless communications device or AP 105 may include the RF front end 1888 mentioned above, which may operate in communication with the one or more antennas 1865 and the transceiver 1802 for receiving and transmitting radio transmissions. The RF front end 1888 may be connected to the one or more antennas 1865 and can include one or more low-noise amplifiers (LNAs) 1890, one or more switches 1892, one or more power amplifiers (PAs) 1898, and one or more filters 1896 for transmitting and receiving RF signals.

In an aspect, the LNA 1890 can amplify a received signal at a desired output level. In an aspect, each LNA 1890 may have a specified minimum and maximum gain values. In an aspect, the RF front end 1888 may use the one or more switches 1892 to select a particular LNA 1890 and its specified gain value based on a desired gain value for a particular application.

Further, for example, the one or more PA(s) 1898 may be used by the RF front end 1888 to amplify a signal for an RF output at a desired output power level. In an aspect, each PA 1898 may have specified minimum and maximum gain values. In an aspect, the RF front end 1888 may use the one or more switches 1892 to select a particular PA 1898 and its specified gain value based on a desired gain value for a particular application.

Also, for example, the one or more filters 1896 may be used by the RF front end 1888 to filter a received signal to obtain an input RF signal. Similarly, in an aspect, for example, a respective filter 1896 can be used to filter an output from a respective PA 1898 to produce an output signal for transmission. In an aspect, each filter 1896 can be connected to a specific LNA 1890 and/or PA 1898. In an aspect, the RF front end 1888 can use one or more switches 1892 to select a transmit or receive path using a specified filter 1896, LNA 1890, and/or PA 1898, based on a configuration as specified by the transceiver 1802 and/or the one or more processors 1812.

As such, the transceiver 1802 may be configured to transmit and receive wireless signals through the one or more antennas 1865 via the RF front end 1888. In an aspect, the transceiver 1802 may be tuned to operate at specified frequencies. In an aspect, for example, the modem 1814 can configure the transceiver 1802 to operate at a specified frequency and power level based on the configuration of the wireless communications device or AP 105 and the communication protocol used by the modem 1814.

In an aspect, the modem 1814 can be a multiband-multimode modem, which can process digital data and communicate with the transceiver 1802 such that the digital data is sent and received using the transceiver 1802. In an aspect, the modem 1814 can be multiband and be configured to support multiple frequency bands for a specific communications protocol. In an aspect, the modem 1814 can be multimode and be configured to support multiple operating networks and communications protocols. In an aspect, the modem 1814 can control one or more components of wireless communications device or AP 105 (e.g., the RF front end 1888, the transceiver 1802) to enable transmission and/or reception of signals based on a specified modem configuration. In an aspect, the modem configuration may be based on the mode of the modem and the frequency band in use. In another aspect, the modem configuration may be based on AP configuration information associated with wireless communications device or AP 105.

Figure 19:
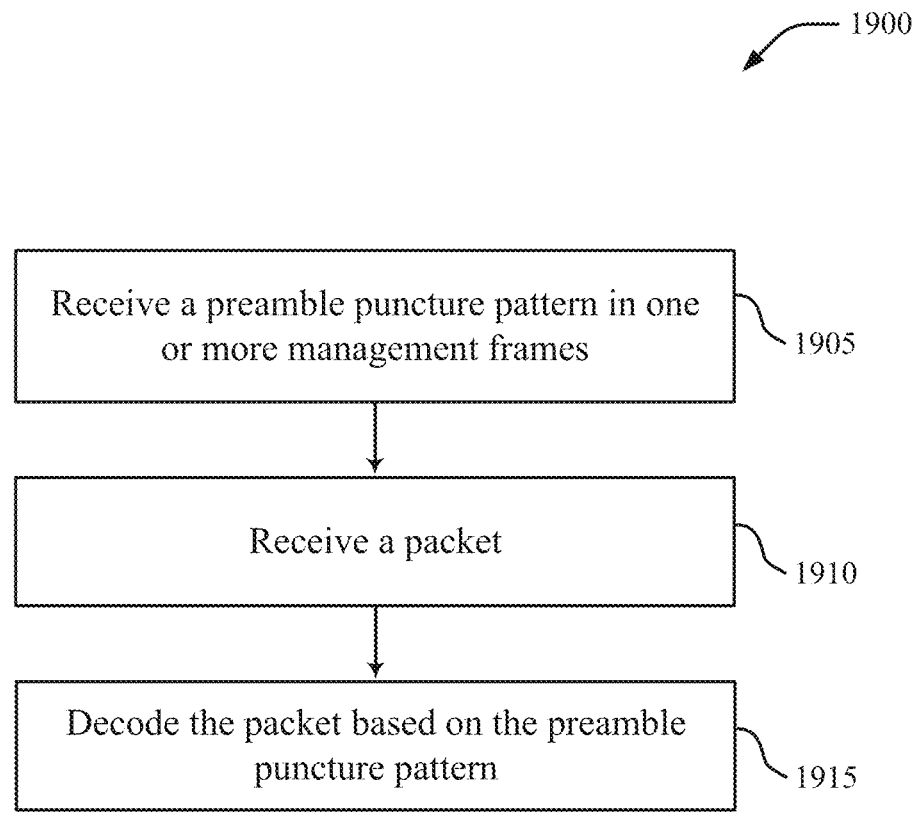
FIG. 19 is a flow diagram illustrating another example of a method in accordance with aspects of the present disclosure.
Figure 20:
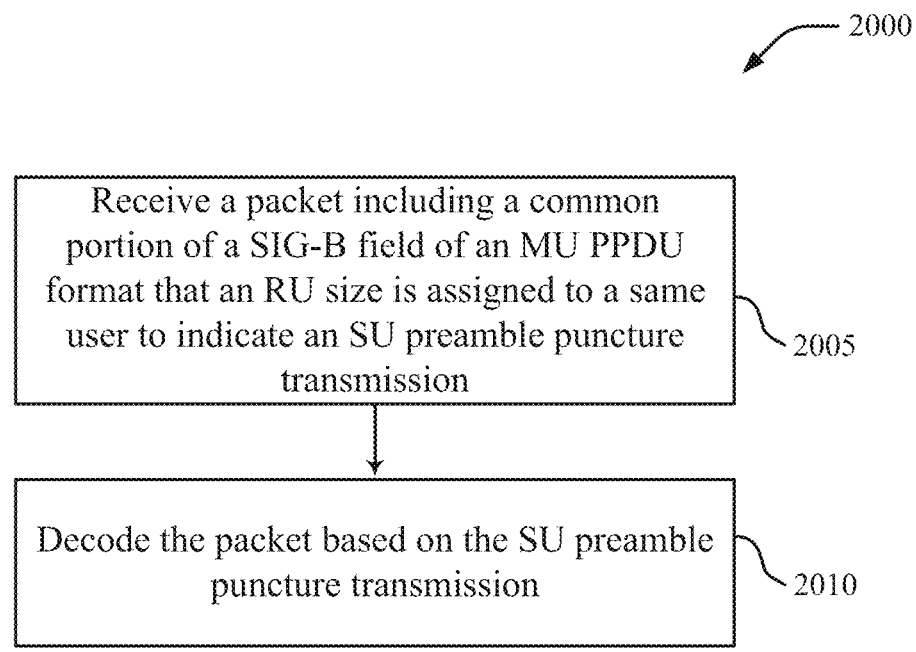
FIG. 20 is a flow diagram illustrating yet another example of a method in accordance with aspects of the present disclosure.
Figure 21:
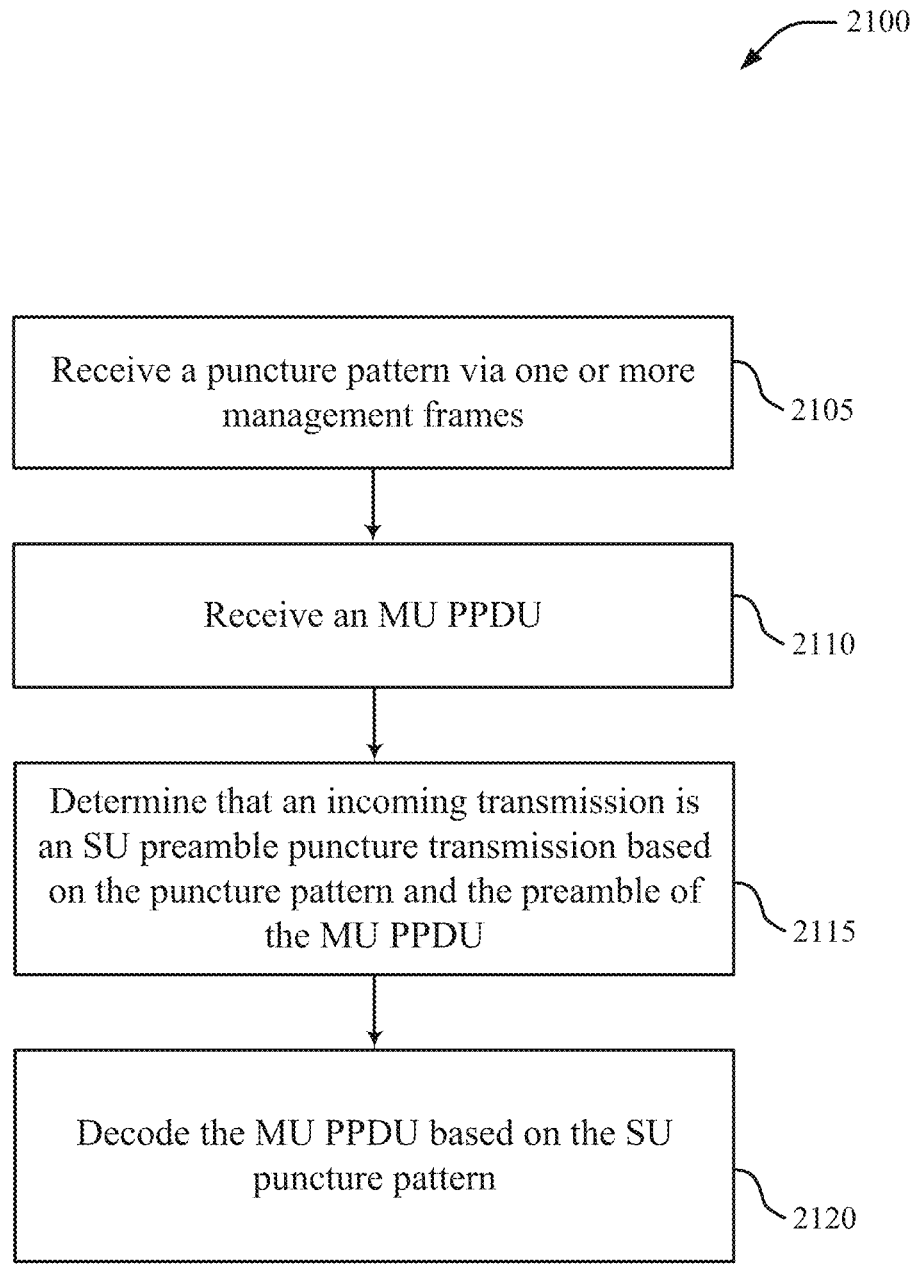
FIG. 21 is a flow diagram illustrating another example of a method in accordance with aspects of the present disclosure.

FIGS. 19-21 are flow diagrams illustrating examples of methods 1900, 2000, and 2100 in accordance with aspects of the present disclosure. Aspects of the methods 1900, 2000, and 2100 may be performed by one or more components of the STA 115 shown in FIG. 22, including but not limited to processors 2212, a modem 2214, a transceiver 2202, a memory 2216, an RF front end 2288, and/or a preamble puncturing component 2250.

Turning to FIG. 19, at 1905, the method 1900 includes receiving a preamble puncture pattern in one or more management frames, the preamble puncture pattern being based on one or more bandwidth regions associated with incumbent technologies. For example, one or more of the components (e.g., processors 2212, modem 2214, and/or preamble puncturing component 2250) of the STA 115 may receive a preamble puncture pattern in one or more management frames, where the preamble puncture pattern is based on one or more bandwidth regions associated with incumbent technologies.

At 1910, the method 1900 includes receiving a packet. For example, one or more of the components (e.g., processors 2212, modem 2214, and/or preamble puncturing component 2250) of the STA 115 may receive a packet from the AP 105. In an example, the packet may contain the preamble puncture pattern, as described above.

At 1915, the method 1900 includes decoding the packet based on the preamble puncture pattern. For example, one or more of the components (e.g., processors 2212, modem 2214, and/or preamble puncturing component 2250) of the STA 115 may decode the packet based on the preamble puncture pattern, as previously described.

Turning to FIG. 20, at 2005, the method 2000 includes receiving a packet including a common portion of a SIG-B field of an MU PPDU format that an RU size is assigned to a same user to indicate an SU preamble puncture transmission. For example, one or more of the components (e.g., processors 2212, modem 2214, and/or preamble puncturing component 2250) of the STA 115 may receive a packet including a common portion of a SIG-B field of an MU PPDU format that an RU size is assigned to a same user to indicate an SU preamble puncture transmission.

At 2010, the method 2000 includes decoding the packet based on the SU preamble puncture transmission. For example, one or more of the components (e.g., processors 2212, modem 2214, and/or preamble puncturing component 2250) of the STA 115 may decode the packet based on the SU preamble puncture transmission.

Turning to FIG. 21, at 2105 the method 2100 includes receiving a puncture pattern via one or more management frames. For example, one or more of the components (e.g., processors 2212, modem 2214, and/or preamble puncturing component 2250) of the STA 115 may receiving a puncture pattern via one or more management frames.

At 2110, the method may also include receiving an MU PPDU. For example, one or more of the components (e.g., processors 2212, modem 2214, and/or preamble puncturing component 2250) of the STA 115 may receive an MU PPDU.

At 2115, the method 2100 includes determining that an incoming transmission is an SU preamble puncture transmission based on the puncture pattern and the preamble of the MU PPDU. For example, one or more of the components (e.g., processors 2212, modem 2214, and/or preamble puncturing component 2250) of the STA 115 may determine that an incoming transmission is an SU preamble puncture transmission based on the puncture pattern and the preamble of the MU PPDU.

At 2120, the method 2100 includes decoding the MU PPDU based on the SU puncture pattern. For example, one or more of the components (e.g., processors 2212, modem 2214, and/or preamble puncturing component 2250) of the STA 115 may decode the MU PPDU based on the SU puncture pattern.

Figure 22:
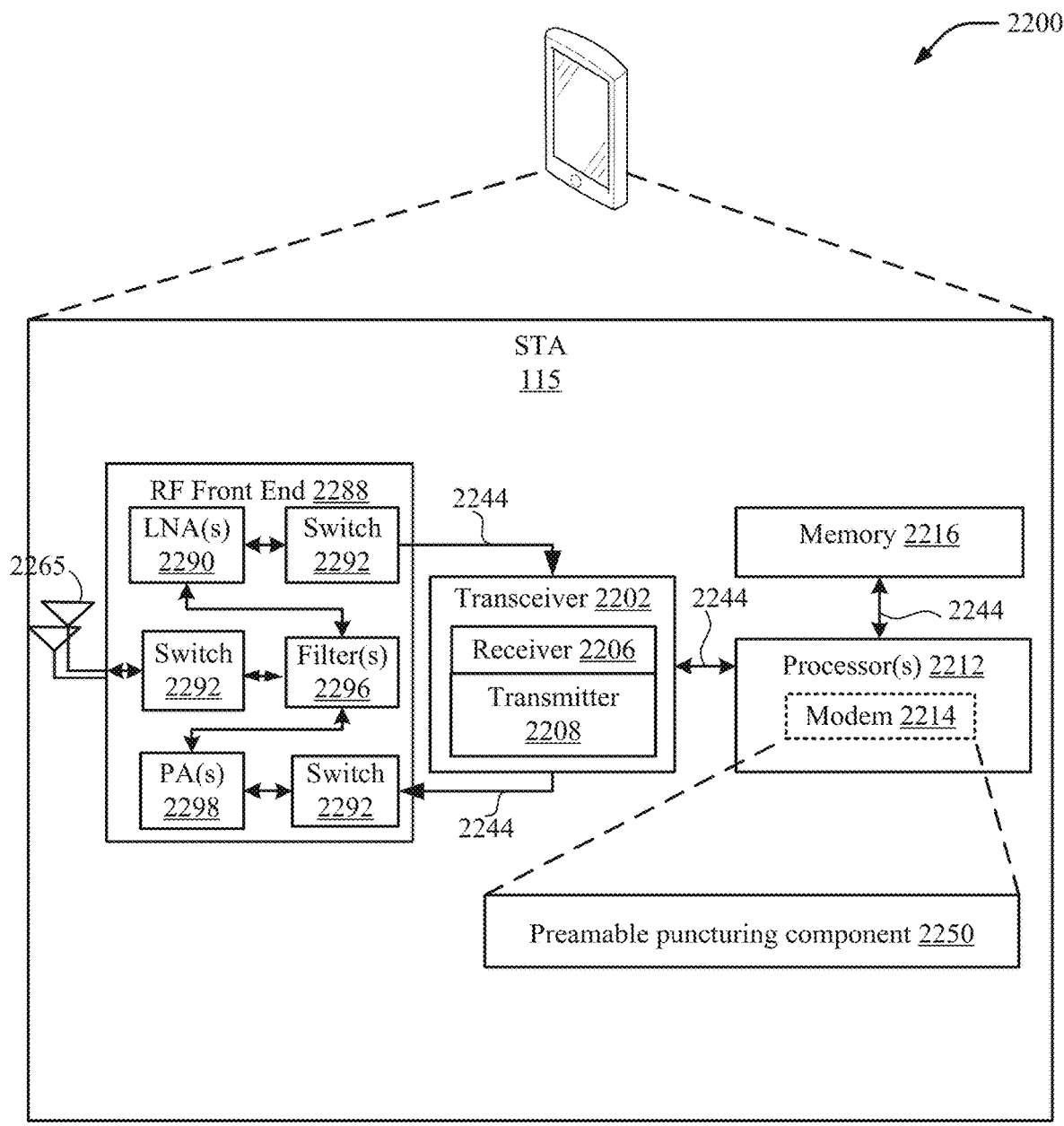
FIG. 22 is a schematic diagram illustrating an example of various components in a wireless station (STA) in accordance with various aspects of the present disclosure.

FIG. 22 describes hardware components and subcomponents of a wireless communications device (e.g., STA 115) for implementing the techniques for preamble puncturing provided by this disclosure. For example, one example of an implementation of the STA 115 (e.g., a receiver) may include a variety of components, including one or more processors 2212, a memory 2216, a modem 2214, and a transceiver 2202, which may communicate between them using a bus 2244. For example, the one or more processors 2212, the memory 2216, the transceiver 2202, and/or the modem 2214 may be communicatively coupled via the one or more buses 2244. The transceiver 2202 may include a receiver 2206 and a transmitter 2208. Moreover, the STA 115 may include an RF front end 2288 and one or more antennas 1765, where the RF front end 2288 may include LNA(s) 2290, switches 2292, filters 2296, and PA(s) 2298. Each of these components or subcomponents of the STA 115 may operate in a similar manner as the corresponding components described above in connection with FIG. 18.

The one or more processors 2212, the memory 2216, the transceiver 2202, and the modem 2214 may operate in conjunction with the preamble puncturing component 2250 to enable one or more of the functions described herein in connection with an STA (e.g., receiver) for preamble puncturing.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

Moreover, nothing disclosed herein is intended to be dedicated to the public regardless of whether such disclosure is explicitly recited in the claims. No claim element is to be construed under the provisions of 35 U.S.C. § 112 (f), unless the element is expressly recited using the phrase "means for" or, in the case of a method claim, the element is recited using the phrase "step for."

What is claimed is:

1. An apparatus for wireless communications, comprising:
   a transceiver;
   a memory configured to store instructions; and
   a processor communicatively coupled with the memory, the processor configured to execute the instructions to:
      identify, within a channel width, one or more bandwidth regions associated with incumbent technologies; and
      broadcast, to a basic service set (BSS) initiated by the apparatus, a preamble puncture pattern in one or more management frames, the preamble puncture pattern being based on the one or more bandwidth regions associated with incumbent technologies.

2. The apparatus of claim 1, wherein the processor is further configured to execute the instructions to:
   set, for a packet to be transmitted, a bandwidth in a SIG-A field of a preamble of the packet.

3. The apparatus of claim 2, wherein the processor is further configured to execute the instructions to:
   zero out one or more channels for transmission of the packet based on the preamble puncture pattern.

4. The apparatus of claim 1, wherein the one or more management frames include a beacon, an association response frame, or a management action frame.

5. The apparatus of claim 1, wherein the one or more management frames include a bitmap indicating the preamble puncture pattern.

6. The apparatus of claim 5, wherein the bitmap is included in an information element.

7. The apparatus of claim 1, wherein the processor is further configured to execute the instructions to:
   transmit a packet based on the preamble puncture pattern, the packet having a single user (SU) Physical Layer Convergence Procedure Protocol Data Unit (PPDU) format or a multi-user (MU) PPDU format.

8. The apparatus of claim 1, wherein the one or more management frames indicate an operating bandwidth of the BSS.

9. The apparatus of claim 1, wherein the processor is further configured to execute the instructions to:
   identify a change in the one or more bandwidth regions associated with incumbent technologies; and
   broadcast, to the BSS initiated by the apparatus, a different preamble puncture pattern in one or more additional management frames, the different preamble puncture pattern being based on the change in the one or more bandwidth regions associated with incumbent technologies.

10. The apparatus of claim 1, wherein the processor is further configured to execute the instructions to:
    periodically broadcast the one or more management frames.

11. The apparatus of claim 1, wherein the processor is further configured to execute the instructions to:
    enable downlink single user (SU) preamble puncturing for a particular client of the apparatus based at least in part on the advertising of the preamble puncture pattern in the one or more management frames, wherein the particular client of the apparatus has allocated more than one resource unit.

12. An apparatus for wireless communications, comprising:
- a transceiver;
- a memory configured to store instructions; and
- a processor communicatively coupled with the memory, the processor configured to execute the instructions to:
  - receive a preamble puncture pattern in one or more management frames, the preamble puncture pattern being based on one or more bandwidth regions associated with incumbent technologies;
  - receive a packet; and
  - decode the packet based on the preamble puncture pattern.

* * * * *